US012701274B2

(12) United States Patent
Kozak et al.

(10) Patent No.: US 12,701,274 B2
(45) Date of Patent: Aug. 4, 2026

(54) CONTENT DISTRIBUTION AND OPTIMIZATION SYSTEM AND METHOD FOR DERIVING NEW METRICS AND MULTIPLE USE CASES OF DATA CONSUMERS USING BASE EVENT METRICS

(71) Applicant: WarnerMedia Direct, LLC, New York, NY (US)

(72) Inventors: Serhii Kozak, Anderson Island, WA (US); Pam McCormack, Bellevue, WA (US); Nicolas Webb, Bothell, WA (US); Jiming Ye, Seattle, WA (US); Elias Mendel, Seattle, WA (US); Agnelo D'costa, Redmond, WA (US); Aeden Jameson, Seattle, WA (US); Jing Yang, Bothell, WA (US); Chase Meador, Sammamish, WA (US); Brandon Sislow, Seattle, WA (US); Bradley C LeRoss, Kirkland, WA (US)

(73) Assignee: WarnerMedia Direct, LLC, New York, NY (US)

( * ) Notice: Subject to any disclaimer, the term of this patent is extended or adjusted under 35 U.S.C. 154(b) by 67 days.

(21) Appl. No.: 17/561,456

(22) Filed: Dec. 23, 2021

(65) Prior Publication Data

US 2023/0209105 A1 Jun. 29, 2023

(51) Int. Cl.
| | |
|---|---|
| *H04N 21/234* | (2011.01) |
| *H04N 21/24* | (2011.01) |
| *H04N 21/258* | (2011.01) |
| *H04N 21/482* | (2011.01) |

(52) U.S. Cl.
CPC ... *H04N 21/23418* (2013.01); *H04N 21/2408* (2013.01); *H04N 21/25833* (2013.01); *H04N 21/25841* (2013.01); *H04N 21/4828* (2013.01)

(58) Field of Classification Search
None
See application file for complete search history.

(56) References Cited

U.S. PATENT DOCUMENTS

| | | | | |
|---|---|---|---|---|
| 5,694,323 | A * | 12/1997 | Koropitzer | .............. G07F 9/002 340/870.1 |
| 8,661,472 | B1 * | 2/2014 | Kardatzke | .......... H04N 21/4622 725/48 |

(Continued)

*Primary Examiner* — Jason K Lin
(74) *Attorney, Agent, or Firm* — Alston & Bird LLP

(57) ABSTRACT

Provided is a content distribution and optimization system that ingests raw event data from a client computing device at an entry point of a data pipeline service in accordance with a defined schema. Each payload of the raw event data comprises a first set of dimensional properties provided by the client computing device and/or a second set of dimensional properties added by the processor at the entry point. The raw event data is transmitted to a message bus pipeline for enrichment. A distinct use case is derived for each data consumer at a same time instant based on the enriched raw event data comprising same base event metrics associated with the base event. One or more payloads of the raw event data are transmitted to a stream-based messaging bus as raw video events. New metrics are derived based on raw video events for network selection and centralized alarming and reporting.

20 Claims, 6 Drawing Sheets

(56)     References Cited

U.S. PATENT DOCUMENTS

| | | | |
|---|---|---|---|
| 8,745,647 B1 * | 6/2014 | Shin | H04N 21/442 |
| | | | 725/9 |
| 9,654,360 B1 * | 5/2017 | Kellicker | H04L 65/80 |
| 10,079,861 B1 * | 9/2018 | Siddiqi | H04L 65/1066 |
| 2004/0054589 A1 * | 3/2004 | Nicholas | G06Q 30/02 |
| | | | 705/14.57 |
| 2010/0077056 A1 * | 3/2010 | Kokal | H04N 21/47202 |
| | | | 709/217 |
| 2011/0110515 A1 * | 5/2011 | Tidwell | H04N 21/812 |
| | | | 380/200 |
| 2014/0164584 A1 * | 6/2014 | Joe | H04L 67/1021 |
| | | | 709/223 |
| 2015/0062287 A1 * | 3/2015 | Reinhardt | H04N 21/25841 |
| | | | 348/36 |
| 2015/0201227 A1 * | 7/2015 | Krasko | H04N 21/25883 |
| | | | 725/34 |
| 2015/0248697 A1 * | 9/2015 | Mahadevan | H04N 21/2396 |
| | | | 705/14.53 |
| 2015/0358507 A1 * | 12/2015 | Eyer | H04N 21/8586 |
| | | | 348/515 |
| 2017/0289226 A1 * | 10/2017 | Deshpande | H04N 21/25866 |
| 2018/0217220 A1 * | 8/2018 | Gulani | G01R 33/5676 |
| 2021/0081492 A1 * | 3/2021 | Higginson | G06N 20/00 |
| 2021/0232473 A1 * | 7/2021 | Laskawiec | G06F 9/5005 |
| 2022/0286753 A1 * | 9/2022 | Mulford | G06Q 30/02 |

* cited by examiner

CONTENT DISTRIBUTION AND OPTIMIZATION SYSTEM AND METHOD FOR DERIVING NEW METRICS AND MULTIPLE USE CASES OF DATA CONSUMERS USING BASE EVENT METRICS

CROSS-REFERENCE TO RELATED APPLICATIONS/INCORPORATION BY REFERENCE

None.

FIELD OF TECHNOLOGY

Certain embodiments of the disclosure relate to a content distribution and optimization system. More specifically, certain embodiments of the disclosure relate to a content distribution and optimization system and method for deriving new metrics and multiple use cases of data consumers using base event metrics.

BACKGROUND

Recent advancements in the field of content creation and distribution are triggering massive expectations on what the delivery of viewing experiences should entail. There is now a greater emphasis on providing content choice, brand loyalty, and personalization with the preferences and expectations of a viewer at the center of every media content offering. This has organically led to a paradigm shift from broadcast workflows to direct to consumer (DTC) content delivery models where all consumers are able to access whatever content they want to view on a preferred device at any time that suits them. To evolve with the growing brand loyalty towards, for example, particular sports players, teams, and bands, the content providers are beginning to turn to breakthrough modes of media content delivery.

A content provider may correspond to free television broadcasters (for example, local broadcasters, such as NBC®, and Fox®), for-pay television broadcasters (for example, ESPN®, and Cinemax®), and/or web-based content providers (for example, streaming content from web sites). To provide maximal quality of experience to the viewers, the content providers require analytical services, such as session level viewership data, to report on metrics and operational alarming and further selection of a suitable content delivery network (CDN) to use for video delivery.

Existing platforms for providing such analytical services are available. However such platforms are implemented as a set of third-party tools directly instrumented on client devices via software development kits (SDKs). Such SDKs capture the metrics by using a log handler that subscribes to events firing from within the video player at the client computing device and transforming the events to the protocol spec. Such third-party tools use separate event streams (containing only necessary properties or dimensions for a specific use case) sent by the client computing devices to provide required information, such as startup times, error rates, buffering ratios on individual streams and an aggregate, to meet both real time monitoring scenarios as well as generic content reporting requirements. For example, a first event stream may be sent to the third-party tools for quality measurement. A second event stream may be directly sent to another system for content reporting on, for example, how many people watched and what content they watched. A third event stream may track, for example, which viewer was watching what content for resuming a playback, for different client computing devices.

However, the usage of such third-party tools may be challenging due to various reasons. For example, any breakage of single source of truth practices for analytics reporting with discrepancies between event models, definitions, and metrics may result in hundreds of hours of investigations for data analysts and engineers, thus incurring additional cost for the content provider. In another example, separate alarming and monitoring solutions, i.e., one for service infrastructure and one for video may require maintenance overhead of configuring alarms in two ecosystems, thus requiring extended memory and processor usage. In yet another example, distributed ownership of CDN configuration and routing make it difficult to update and add additional providers, thus inadequate leverage of available resources. Further, the content providers have to rely on directly ingesting session level aggregate data delivered daily from such third-party tools to drive reporting metrics for video-on-demand content or live content. This lag of 24-hours for providing the aggregated data may make the process of operational reporting and alarming increasingly cumbersome, time consuming and deficient of real-time monitoring and instantaneous debugging the issues, thus compromising on the overall seamless viewing experience of the viewer.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for content distribution and optimization system and method for deriving new metrics and multiple use cases of data consumers using base event metrics, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1A:
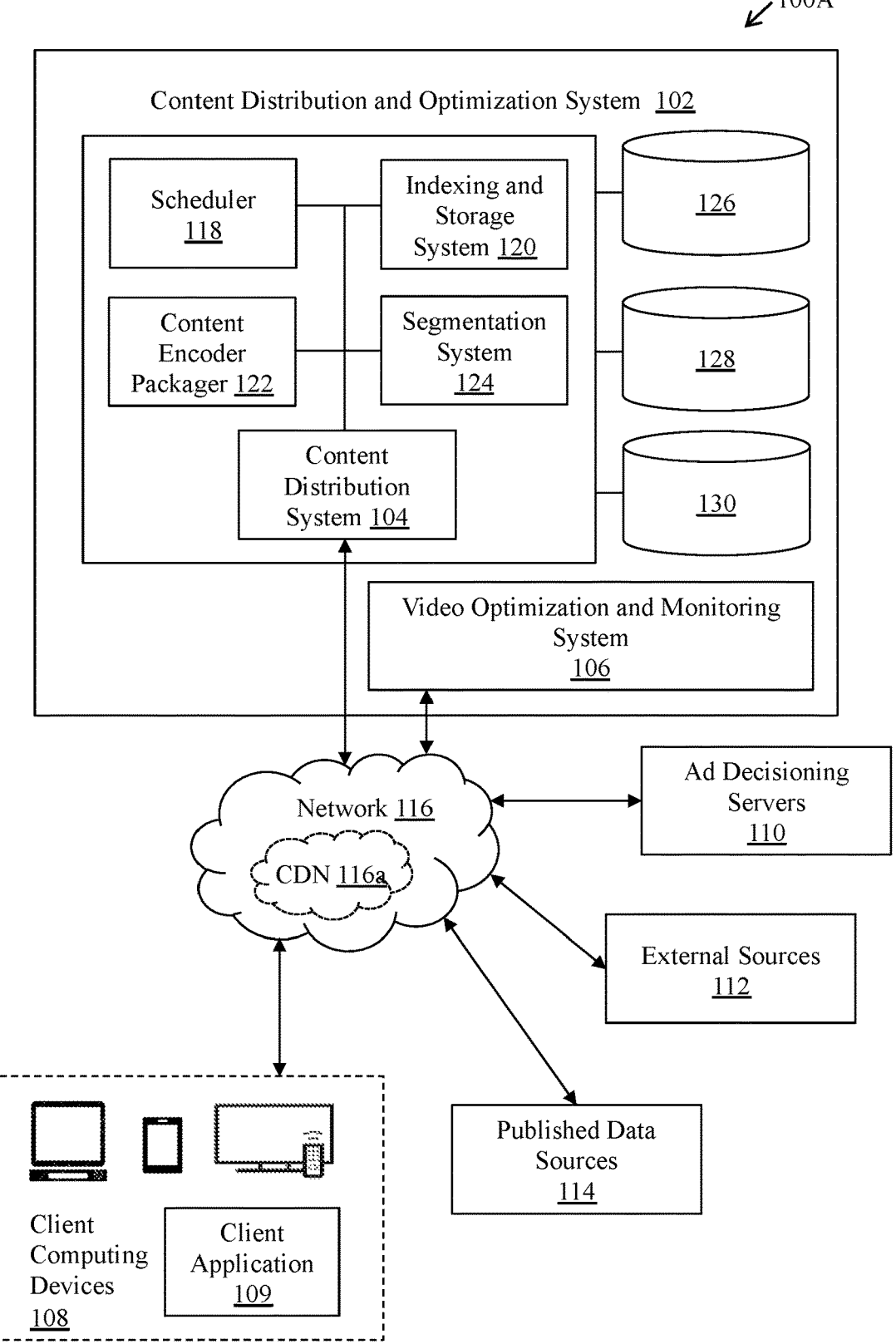
FIG. 1A is a block diagram that illustrates an exemplary network environment for deriving new metrics and multiple use cases of data consumers using base event metrics, in accordance with an exemplary embodiment of the disclosure.

Certain embodiments of the disclosure may be found in a content distribution and optimization system and method for deriving new metrics and multiple use cases of data consumers using base event metrics. Various embodiments of the disclosure provide a content distribution and optimization system and method for event ingesting in a publisher/ subscriber (Pub/Sub) model that allows to create a single publication of an event emitted by a client device, and perform batch processing, real-time aggregate, and real-time monitoring thereupon. The Pub/Sub model further allows to drive product scenario features, for example where to resume a playback, on the application itself for different client devices. Said differently, a single event may be published, enriched and concurrently distributed to multiple data consumers on the server-side to derive new metrics and multiple distinct use cases of data consumers. Further, based on the derived new metrics, the selection of a suitable CDN and routing is more efficient.

In accordance with an embodiment, the core of the present disclosure pertains to the standardization on a heartbeat mechanism that may have a set of dimensions that may be utilized for different types of consumer use cases. Heartbeat mechanism may be an event that fires from the client application at regular intervals, such as every 30 seconds, to describe what was occurring within the video player itself, where was it positioned, how many bytes for delivery, what platform it was on, what piece of content was viewed, thus essentially describing the quality of delivery. The same heartbeat event may be relied upon to derive real user monitoring metrics for a video quality of service delivery. The same heartbeat event may be utilized when it is modelled in aggregate to derive content insights and reporting around engagement types, such as what has been watched, where are the drop off rates, whether a metric is lost. The heartbeat event may be also utilized to derive continue watching logic, for example when the user clicks play, the event gets emitted as the heartbeat and then when the user clicks pause and resume from another device, a consumer use it as a marker to tell the user where to resume from. Further, the same marker may be utilized to aggregate data across content delivery networks (CDNs) or ASNs to determine a quality of delivery by those providers to which the content may be more appropriately routed based on the combination of device platform and delivery mechanism. Thus, the heartbeat mechanism is extended to other scenarios around application health monitoring for how the quality of delivery is monitored. Thus, the heartbeat mechanism is applied to not just the session for video delivery, but the whole or entire application rendering experience as the user interacts with the application itself.

The proposed system and method may provide an built-in or integrated solution that derives new video quality of service (videoqos) metrics, multiple use cases of data consumers, and an efficient CDN selection by using a single base event for operational reporting and alarming to maximize the quality of video stream delivered for each client device.

In accordance with various embodiments of the disclosure, a content distribution and optimization system comprises a memory for storing instructions and a processor implemented in a data pipeline service. The processor may be configured to execute the instructions to perform a method. The method may include ingesting raw event data from a client computing device at an entry point of the data pipeline service in accordance with a defined schema. The raw event data may correspond to a base event comprising a plurality of payloads. Each payload may comprise a first set of dimensional properties provided by the client computing device and/or a second set of dimensional properties added by the processor at the entry point. Each of the first and the second sets of dimensional properties may correspond to logically grouped attributes and corresponding data values. The method may further include transmitting the raw event data to a message bus pipeline for enrichment. A distinct use case may be derived for each data consumer at a same time instant based on the enriched raw event data comprising same base event metrics associated with the base event. The method may further include transmitting one or more payloads from the plurality of payloads of the raw event data to a stream-based messaging bus as raw video events. New metrics may be derived based on the raw video events for network selection and centralized alarming and reporting.

In accordance with various embodiments of the disclosure, the base event metrics may comprise application metrics, device metrics, session metrics and heartbeat metrics to provide the distinct use case for each data consumer. The raw event data may be retrieved from a cloud object storage of the message bus pipeline. The retrieved raw event data may be enriched with additional information. The additional information may correspond to geographic information associated with an internet protocol (IP) address of the client computing device. The enriched raw event data and a normalized data feed may be collated in a time-ordered series. Transformations may be applied on the enriched raw event data. The derivation of the distinct use case for each data consumer at the same time instant may be based on the applied transformations on the enriched raw event data. A user interaction may be grouped with a player at the client computing device from a point when a play button is clicked based on a last video session initiated timestamp and a device serial number or a device identifier (ID). The raw video events may be enriched to include additional information. The additional information may include at least geographic information of the client computing device and designated market area (DMA). The raw video events are further validated and structured in addition to the enrichment. The derived new metrics may be transmitted to an analytical search engine for real-time aggregation. The content delivery network (CDN) scoring metrics may be derived using videoqos topics. The videoqos topics may be determined based on the derived new metrics. The derived new metrics may include at least video start failure, video playback failure and video start time. A CDN may be selected for routing traffic based on the derived CDN scoring metrics and video metadata. A session may be constructed at server-side for an application based on a defined business rule using session timestamps from a session payload. The session payload may comprise an application launch timestamp. The plurality of payloads may correspond to an application payload, a device payload, a session payload, a referral payload, a visitor identity payload, an event payload, and a page payload. The first set of dimensional properties of the event payload may include a type of the event, a subtype of the event, and a client timestamp. The second set of dimensional properties of the event payload includes a server timestamp added by the processor at server-side. The subtype of the event may be a heartbeat event when the type of the event is video quality of service (videoqos) event. The heartbeat event may correspond to an application heartbeat or a video heartbeat. The derivation of the distinct use case for each data consumer at the same time instant corresponding to batch-based analytical processing and the derivation of new metrics for network selection and centralized alarming and reporting corresponding to real-time stream processing may be based on at least the heartbeat event. The data consumer may correspond to at least one of a QoS delivery tool, a reporting tool, a customer service tool, an internal fraud tool, a content insights tool, and a subscription reporting tool.

FIG. 1A is a block diagram 100A that illustrates an exemplary network environment for deriving new metrics and multiple use cases of data consumers using base event metrics, in accordance with an exemplary embodiment of the disclosure. Referring to FIG. 1A, the network environment illustrated by the block diagram 100A includes a content distribution and optimization system 102 that further includes a content distribution system 104 and a video optimization and monitoring system 106. The block diagram 100A further illustrates client computing devices 108, Ad decisioning servers 110, external sources 112, published data sources 114, and a network 116 (or a content delivery network (CDN) 116a). The content distribution and optimization system 102 may include further components, such as a scheduler 118, an indexing and storage system 120, a content encoder packager 122, a segmentation system 124, a media content master storage system 126, a media content metadata storage system 128, and a schedules, rights, and user preferences (SRU) database 130 associated with the content distribution system 104.

The content distribution and optimization system 102 may comprise suitable logic, circuitry, and/or interfaces that may be configured to execute code that manages and handles processing of content comprising audio, video, images, metadata, manifests, and/or other data that is embedded and/or referenced externally. In this regard, the content distribution and optimization system 102 may provide video programming services to viewers for a subscription fee, such as pay television. The content distribution and optimization system 102 generates on-demand disparate media output streams to be viewed on each of the client computing devices 108. In accordance with certain embodiments, the content distribution and optimization system 102 may also handle distribution, for example, multicasting, unicasting, broadcasting, streaming, for one or more channels to be viewed on one or more of the client computing devices 108. The media content may include a video, an audio, a combination of audio and video presentations, a combination of audio, video, a combination of multiple-audio, multiple-video, and/or embedded or externally referenced metadata. The media content may also include metadata, such as game scores, statistics, or timings, social media, cast/character/credits, geo-spatial data, and/or still-images or graphics (referenced or embedded), associated with the audio/video presentation.

The content distribution and optimization system 102 may be operated by an entity related to handling or distribution of media content, for example, a broadcast provider or operator, or a network provider or network operator. The entity related to handling or distribution of media content may also be referred to as a content owner, a distributor, a syndicator, a re-distributor, a content aggregator, a search, discovery, or cataloging service provider, or any other entity actively or passively involved with the distribution, cataloging, or referencing of complete or partial presentations of media content. Throughout this document, the terms broadcast provider or broadcast operator, a content provider or operator, and network provider or network operator may be utilized to refer to the entity related to handling or distribution of media content, interchangeably. The broadcast provider may handle a single channel, a plurality of channels, or one or more CDNs. The broadcast provider may be configured to distribute content via one or more platforms, for example, traditional over-the-air broadcast channels, radio, cable television networks, satellite communication networks, the Internet, and/or other content delivery networks. In a broadcast chain, the broadcast provider may receive actual content (for example, from a production studio) in a serial digital interface (SDI) video interface and/or on a high-definition SDI (HD-SDI) video interface, process the content, such as insertion of graphics, closed captions, preparation of programming schedule, insertion of triggers, and the like, and final delivery by a broadcasting apparatus.

The content distribution and optimization system 102 may receive the MPTS, which includes the signaling content and metadata, from a broadcast provider based on current society of cable telecommunication engineers (SCTE) standards (SCTE-35 and SCTE-224) to control web and regional blackouts, network end of day switching, and advertisement insertion. For example, the content distribution and optimization system 102 may be signaled for various blackout types with in-band SCTE-35 message. Examples of the content distribution and optimization system 102 may include direct-broadcast satellite (DBS) providers, cable television (CATV) systems, and other wireline video providers and competitive local exchange carriers (CLECs) using IPTV.

The content distribution system 104 may comprise suitable logic, circuitry, and/or interfaces that may be configured to execute code to generate a disparate media output stream to be viewed on a client computing device, in accordance with the specified play schedule, such as a programming schedule provided by the scheduler 118. Based on the programming schedule, the content distribution system 104 may be configured to generate live media output streams to be delivered to one or more of the client computing devices 108 over a web page, a web service, or an installed application (i.e. app). In accordance with an embodiment, the content distribution system 104 may generate a specific live media output stream corresponding to a live media content. In accordance with an embodiment, the content distribution system 104 may be configured to insert media segments that are referenced by manifests associated with a plurality of pre-encoded media assets (stored in the indexing and storage system 120) into a disparate media output stream manifest. The insertion may be based on intervals equal to a content segment duration to generate a disparate media output stream. The manifest may correspond to a text-based instruction set that may instruct the client computing devices 108 which and where to acquire the pre-encoded media assets for playout. The disparate media output stream, thus generated, is in a suitable state (or ready) to be distributed to web media players or apps in one or more of the client computing devices 108.

The decisioning as to which the pre-encoded media assets to select for delivery over the network 116 to the one or more of the client computing devices 108 may be based on the manipulation of the manifests that correspond to the programming schedules in real time or near-real time. The manipulation of the manifests may be based on the programming schedules that may be driven by, for example, real time or near-real time content context analysis, user-selection on the client computing devices 108, or external data received from the external sources 112, in addition to the real-time data, such as desired channel theme, content metadata, pre-specified content rights, content availability, content eligibility, and stream operator preferences, received from various databases.

The content distribution system 104 may also be referred to as a stream manipulator that may be configured to insert media segments from live content or pre-stored media content, in an existing program stream, based on manipulation of manifests corresponding to programming schedule of the existing program stream. The insertion of live content, pre-stored media content, pre-encoded media assets, and/or the like may be driven by real time or near-real time content context analysis, user-selection on the client computing devices 108 or driven by external data received from the external sources 112. Alternatively, both the live or pre-stored programming content (such as long-form presentations, short-form presentations, news or sporting events) and non-programming content (such as paid advertisements, public service advertisements, or promotional material), may be dynamically scheduled, and inserted to create new streams based on real time or near-real time (or with a certain lag time) manipulation of the manifest corresponding to the programming schedule.

The video optimization and monitoring system 106 may comprise suitable logic, circuitry, and/or interfaces that may be configured to execute code to obtain comprehensive videoqos metrics available for operational reporting and alarming so that the quality of video stream delivered for each of the client computing devices 108 can be maximized. The video optimization and monitoring system 106 may be utilized for detecting service issues that matter to client computing devices 108 so that the content distribution and optimization system 102 can rapidly respond to the issues to allow for a high-quality user experience. The video optimization and monitoring system 106 may enable assessment of collected events and data that is associated with the content delivery, the network 116 and the client computing devices 108 in order to effectively manage service offerings and detect and respond to issues prior to requests raised by the users. In accordance with an embodiment, the video optimization and monitoring system 106 may be configured to utilize network measurements to infer quality of experience (QoE).

In accordance with an embodiment, the video optimization and monitoring system 106 may utilize the videoqos metrics for operational reporting and alarming so that the quality of video stream delivered for each client computing device may be maximized. The video optimization and monitoring system 106 may generate an automated report comparing week over week, month over month, and year over year videoqos metrics so that anomalous behavior can be identified, and action items may be driven for improvement in the user experience. For reporting, the filtration may be performed based on various dimensions, such as content, device, geo location and network available within the videoqos metrics. In accordance with an embodiment, the video optimization and monitoring system 106 may perform investigation by video playback error/event types. In accordance with an embodiment, the video optimization and monitoring system 106 may be configured to report the 99th percentile of Videoqos metrics in less than 5 minutes from time of event firing on a client computing device to aggregate statistic to ensure that response can be generated within incident service-level agreement should an issue be identified.

The client computing devices 108 may refer to end-user devices or consumption devices where the content is played and consumed by a user. The number of impressions of a media item, such as an advertisement and/or promotional media, on such plurality of client computing devices 108 determine the advertising impact or promotion impact and number of actual audiences achieved during campaigns. Examples of the client computing devices 108 may include, but are not limited to connected TVs, connected TV with paired and/or connected devices (e.g., HDMI sticks, tablets), personal computer, smartphone, tablet, OTT set-top, or hybrid set-top, and second screen devices such as smartphones, tablets, game consoles, personal computers, set-top boxes, embedded devices, or any process/system capable of processing the output for any means, regardless of the capability or intent to decode for media presentation, and on which the consumer may launch a web page, a web application, or a web service to view media content.

Each of the client computing devices 108 may be configured to execute various applications, such as a client application 109 or other applications. On example of such client application 109 may be a DTC application. The client application 109 may be executed in each of the client computing devices 108, for example, to access network content served up by the ancillary services or other servers, thereby rendering a user interface on its display. To this end, the client application 109 may comprise, for example, a web browser, a dedicated application, or the like, and the user interface may comprise a network page, an application screen, or the like. In some embodiments, the dedicated application includes, for example, email applications, social networking applications, word processors, spreadsheets, and/or other applications. The client computing devices 108 may be configured to execute applications beyond the client application 109.

The Ad decisioning servers 110 may comprise suitable logic, circuitry, and/or interfaces that may be configured to execute code to determine which advertisements, overlay graphics and presentation information to serve to the client computing devices 108 based on a stream ID, a program ID, a geolocation, time, and preferences associated with an individual users or advertisement ID. The Ad decisioning servers 110 may implement at least an advertisement decisioning component that may be utilized during a real-time content or advertisement placement activity, for example during dynamic ad insertion. For example, commercial or non-commercial advertisements may be dynamically inserted within program segments of a media asset based on the detected upcoming indicator, such as an inbound trigger, a signaling point, and/or a signal in a source stream by the Ad decisioning servers 110.

The external sources 112 may include third-party content providers that may provide pre-encoded assets to the content distribution and optimization system 102. The external sources 112 may further include third-party platforms that may store audience data corresponding to subscribers of the plurality of client computing devices 108. The audience data may include demographics data, audience targeting data, trending data, device type data, device platform data, and content recognition-based data. The trending data also comprises information on what's trending based on social engagement, such as number of likes or votes to a particular media item, or number of people watching a particular media item on the social networks (or platforms), such as Twitter®, Facebook®, and the like. The trending data may indicate an aggregate interest level of a number of users in the social networks for a particular media item. For example, a thousand or more shares, or likes by a number of users may indicate a highly popular media item.

Each of the published data sources 114 may comprise suitable logic, circuitry, and/or interfaces that may be configured to execute code that provides actual audiences for programs that were distributed. As illustrated in FIG. 1A, the published data sources 114 are coupled to the content distribution and optimization system 102 via the network 116 and configured to monitor audience drift to or away. The published data sources 114 may provide actual audiences for programs to the indexing and storage system 120. An exemplary published data source may be Nielsen. Nielsen has the capability to determine when a viewer watches the same set of media items, for example, advertisements and/or promotional content, in programming data, such as an episode within 3 days of original airing and provide Nielsen "C3"credit. Another exemplary published data source may be a published database that provides ratings for a media item, such as gross rating point (GRP). The GRP is advertising or promotion impact measure for each advertising and/or promotional campaigns, known in the art. Other exemplary published data sources may also include direct/indirect access to other public or private data sources (persistent or ephemeral) through programmatic means.

The network 116 may be any kind of network, or a combination of various networks, and it is shown illustrating the communication that may occur between the content distribution and optimization system 102 and the other data sources, devices, and/or systems. In accordance with various embodiments, the network 116 may comprise one or more of a cable television network, the Internet, a satellite communication network, a wide area network (WAN), a medium area network (MAN), a local area network (LAN), or a CDN 116a.

The CDN 116a may be or may include one or more suitable internet protocol based networks for transmitting content data, such as media content, to servers or remote users. A CDN service provider typically maintains a number of computers in a network that can maintain content from various content providers. In turn, content providers can instruct, or otherwise suggest to, the client computing devices 108 to request some, or all, of the content provider's content from the computers of a particular CDN service provider. Preferably, the CDN 116a is load balanced and fault tolerant at the client level. The CDN 116a may be configured to provide media content to the plurality of client computing devices 108 via a transport stream, segmented streaming, progressive download, or any other modes of distributing a multimedia presentation, such as via an over-the-air content delivery/distribution network, a linear content delivery/distribution network, a cable content delivery/distribution network, a satellite content delivery/distribution network, an IP-based content delivery/distribution network, and/or the like.

The scheduler 118 may comprise suitable logic, circuitry, and/or interfaces that may be configured to execute a code that creates and handles a programming schedule of pre-encoded or on-demand media assets. The programming schedule of the pre-encoded or on-demand media assets defines which pre-encoded or on-demand media assets should be scheduled, time and duration at which the pre-encoded or on-demand media assets should be played in the generated disparate media output streams, the ordering of the pre-encoded or on-demand media assets during playout, and when to distribute the media content to the client computing devices 108 over the web application, service or page. The scheduler 118 may create the programming schedule based on a desired theme, content metadata, content rights, content eligibility, and content availability of the pre-encoded or on-demand media assets. The scheduler 118 may also provide the capability to format non-programming break, such as ad break, durations and locations, as well as graphic overlay locations on the pre-encoded or on-demand media assets displayed on the client computing devices 108. The media content that is distributed may include both the programming content, such as long-form presentations, short-form presentations, news or sporting events, and non-programming content, such as paid advertisements, public service advertisements, or promotional material. In accordance with an embodiment, the programming schedule may comprise data structures or file formats capable of being processed by a computer, and may comprise a reference mapping of different media content items that needs to be utilized by the content distribution system 104.

The scheduler 118 may generate an instruction set as the programming schedule for each disparate media output stream to be generated and informs the content distribution system 104. In accordance with an embodiment, the programming schedule may be a text file or an eXtensible Markup Language (XML) file, which comprises a reference mapping of different media content items or media segments of the pre-encoded media assets.

The indexing and storage system 120 may comprise suitable logic, circuitry, and/or interfaces that may be configured to be ingested with a plurality of manifests associated with the plurality of pre-encoded media assets. The indexing and storage system 120 may also store, process, and generate aggregate viewing information based on various data feeds received from the external sources 112 and the published data sources 114. In accordance with an embodiment, the indexing and storage system 120 may be configured to ingest the manifests of the pre-encoded media assets, and perform indexing of the listed media segments, indexing of program boundaries and tag markings, advertisement break locations, overlay opportunities credits, digital rights management systems supported in the indexing and storage system 120.

The media content master storage system 126 may comprise suitable logic, circuitry, and/or interfaces that may be configured to store master versions of the media content. The master versions may be utilized as the source for creating the On-Demand or pre-encoded media assets for the client computing devices in the required formats.

The media content metadata storage system 128 may comprise suitable logic, circuitry, and/or interfaces that may be configured to store media content metadata. The media content metadata may include metadata associated with media content segments stored in the media content master storage system 126. Examples of the media content metadata may include a media content identifier, a title of the media content, type of the media content (such as movie series (season episode number)), genre, plot summary, duration, advertisement break locations, credit locations, scene descriptions, a short summary of the media content segments, a short summary of ideal advertisement placements within the content, a file format, digital right management (DRM), encryption information, length of the media content, a date and/or time the media content was added to the catalog of media content, a new item indicator for the media content (e.g., a new media asset that became available within the last 24 hours, last few days, last week, and/or the like), a media content class, for example, a television show, a cartoon program, a movie, a news media, an episode, a game, a clip, a recorded sports event, interactive media, and/or the like. In general, the clip may be curated or editorially selected excerpts from existing full episodes, TV shows, or movies. In accordance with an exemplary embodiment, the media content metadata storage system 128 may also store program-specific information (PSI) data as defined by ISO/IEC 13218-1 (MPEG-2), closed captioning data, and subtitles associated with the media content segments stored in the media content master storage system 126. Other forms of metadata may be utilized without departing from the spirit and scope of the various embodiments of the disclosure.

The content encoder packager 122 may comprise suitable logic, circuitry, and/or interfaces that may be configured to execute code to determine a package that includes media content and associated metadata. The content encoder packager 122 may be directly coupled to the indexing and storage system 120. Thus, the content encoder packager 122 encodes and packages the media content into the required on-demand formats for delivery to the client computing devices 108. The media content may correspond to one or more of the plurality of media segments transcoded to different types of streams for different types of devices, such as a TV or a mobile device, and marked with Nielson markers. Based on such a package, a corresponding media content distribution device may dynamically generate one or more encoded content assets for playout to the client computing devices 108 communicatively coupled through the CDN 116a.

The segmentation system 124 may comprise suitable logic, circuitry, and/or interfaces that may be configured to breaks each encoded stream into time slices (for example, 10 second period) and then place the stream of packets for that period into a standard file format container that includes the packets and metadata describing the content (for example, MP4 container). Such a container may be stored in the content distribution system 104.

The SRU database 130 may comprise suitable logic, circuitry, and/or interfaces that may be configured to store the schedules for all source feeds, availability rights for all the content in the schedules, regional blackout zones for the various sports leagues, predefined location-based viewing preferences, individual client viewing preferences, and any viewing or transition rules provided by the stream owner operator. The SRU database 130 may further store one or more constraints and rights associated with disparate media output streams based on which one or more functionalities may be enabled. The SRU database 130 may further store a set of rules governing when and how media content may be utilized. For example, when the media content may be made available On-Demand, if the media content may be made available over the Internet, whether the media content may be utilized in a disparate live media output stream and the timeframe, or is the user allowed to restart the media content when streamed. The SRU database 130 may further store index of previous content selections of each user for media content that may be utilized to personalize and organize the user experience going forward.

In operation, the sources associated with the content distribution and optimization system 102 and the external sources 112 may provide content, such as video content, in a defined format, such as MPEG packets, within an IP datagram stream to the headend of the content distribution and optimization system 102. The content may be stored in the media content master storage system 126 for future processing and playout, or the content may be made available in substantially real-time or after a pre-determined time delay and be provided to the content encoder packager 122. The content may be encoded as the single stream and packaged into multiple streams, each encoded into a different resolution format and bit rate. The multiplicity of different stream formats and bit rates enables the content to be sourced to the client computing devices 108 with different capabilities, such as smartphone, personal computer, and tablet computer. After encoding, the segmentation system 124 may be configured to break each stream into time slices (for example, 10 second period) and place the stream of packets for that period into a standard file format container that includes the packets and metadata describing the content (for example, MP4 container). The content distribution system 104 may be configured to publish such files to the CDN 116a for smart distribution to the edges of the network, i.e. the smart phone, personal computer, and tablet computer.

In accordance with an embodiment, the client application 109, such as the DTC apps, installed in the client computing devices 108 may pull the files from the CDN 116a by using standard unicast HTTP Gets and playout the files as VOD content or live content, generically referred to as video content. Various examples of an adaptive streaming protocol may be unicast HTTP Live Streaming (HLS), HTTP Dynamic Streaming (HDS) and IIS Smooth Streaming. In various exemplary scenarios, the client application 109 may fire various events, either user-generated (for example video start event) or system-generated (for example heartbeat events automatically generated at regular intervals), referred to as base events.

Corresponding to such base events, the video optimization and monitoring system 106 may be configured to ingest raw event data from a client computing device at an entry point of a data pipeline service in accordance with a defined schema, such as JSON schema. The raw event data may correspond to the base event comprising a plurality of payloads. Each payload may comprise a first set of dimensional properties provided by the client computing device and/or a second set of dimensional properties added by the video optimization and monitoring system 106 at the entry point. Each of the first and the second sets of dimensional properties corresponds to logically grouped attributes and corresponding data values. The video optimization and monitoring system 106 may be further configured to transmit the raw event data to a message bus pipeline, i.e. S3+SQS, for enrichment. A distinct use case may be derived for each data consumer at a same time instant based on the enriched raw event data comprising same base event metrics associated with the base event. The video optimization and monitoring system 106 may be further configured to transmit one or more payloads from the plurality of payloads of the raw event data to a stream-based messaging bus as raw video events. New metrics may be derived based on the raw video events for network selection and centralized alarming and reporting.

In accordance with an embodiment, the base event metrics comprise application metrics, device metrics, session metrics and heartbeat metrics to provide the distinct use case for each data consumer. Said differently, the base event metrics may correspond to global comment properties identified as the cross dimensions are identified by category between application, device, session, and an actual heartbeat metric.

Accordingly multiple use cases may be covered, for example, use cases for the customer service agent that needed to know when the user started a video, a continue watching marker which needed to know how far the user watched that video, the quality of service metrics which needed to cut the data by device platform in the CDN, and the fourth consumer for subscription data so that within a session, a new set of timestamp may be included for content analysis using the same event instead of admitting a percent complete of the asset. Thus, composable dimensional properties onto the base video metric may service various consumers that have different data needs with the same base event.

Various examples of data consumers may include: 1) First consumers of quality of service delivery may be engineering teams that determine whether or not videos are successfully playing back or being delivered. 2) Second consumers may be internal finance reporting teams wanting to select how much data is sent to various CDNs. 3) Third consumers may be customer service tools that determine what was the last time the user watched the video, from what location the user watched it, and to be able to track if the user is calling to cancel due to any reason. 4) Fourth consumers may be internal fraud tools which use the data to track the number of streams that viewers are concurrently playing and where they are playing around the country so as to actively trace of any user is trying to actively breach the terms of service or if their account has been compromised. 5) Fifth consumers may be content insights group which uses the data to look at how to allocate the revenue or capital to new movies, series, or genres of content based on how many minutes of content the customers have watched and when they had watched it. 6) Sixth consumer of data may use the first asset that's watched on a service after the user signs up for a subscription, i.e. subscription sign up revenue.

Figure 1B:
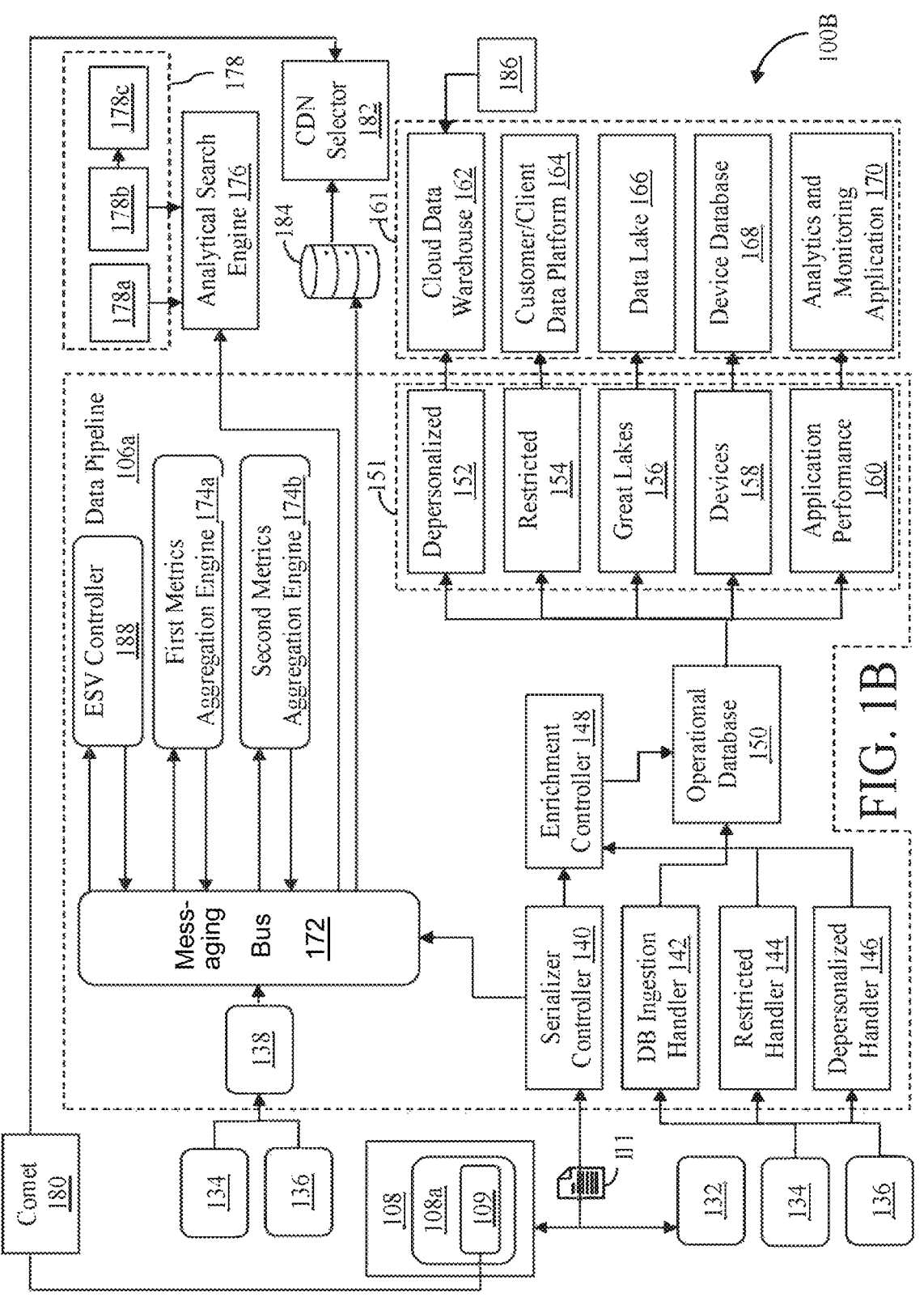
FIG. 1B is a block diagram that illustrates an exemplary content optimization and monitoring system, such as the video optimization and monitoring system 106, communicatively coupled with external analytical tools and services, in accordance with an exemplary embodiment of the disclosure.

FIG. 1B is a block diagram 100B that illustrates an exemplary content optimization and monitoring system, such as the video optimization and monitoring system 106, communicatively coupled with external analytical tools and services, in accordance with an exemplary embodiment of the disclosure. FIG. 1B is described in conjunction with FIG. 1A. With reference to FIG. 1B, the block diagram 100B is illustrated to include various operational components, such as an ancillary service 132, databases 134, third-party systems 136, source connectors 138, a serializer controller 140, a DB ingestion handler 142, a restricted handler 144, a depersonalized handler 146, an enrichment controller 148, and an operational database 150. The block diagram 100B further illustrates a plurality of enrichment layer clients 151, such as depersonalized 152, restricted 154, great lakes 156, devices 158, and application performance 160. The block diagram 100B further illustrates a plurality of data consumers 161, such as a cloud data warehouse 162, a customer/client data platform 164, data lake 166, a device database 168, and an analytics and monitoring application 170. The block diagram 100B further illustrates a messaging bus 172 and a first metrics aggregation engine 174a and a second metrics aggregation engine 174b (collectively referred to as a metrics aggregation engine 174). The block diagram 100B further illustrates an analytical search engine 176, a graphic authoring tool 178a, an analytical and visualization templates 178b and an incident management service 178c (collectively referred to as external tools 178), a comet 180, a CDN selector 182, a CDN scoring database 184, a session inspection controller 186, and a data pipeline enrichment, structure and validation (ESV) controller 188.

With reference to FIG. 1B, such a variety of components may be configured to collectively realize a data pipeline service 106a that receives events from the client computing devices 108 in response to the disparate streaming content being played out at each of the client computing devices 108. The events may be an identifiable unit of data that conveys information about an occurrence. An event may have a timestamp indicating when the event occurred, a set of dimensions indicating various attributes about the event, and a set of metrics related to the event. In accordance with an embodiment, the events may correspond to user-generated events, such as, but not limited to, video start and video stop. In accordance with an embodiment, the events may correspond to system-generated events, such as heartbeat events that are emitted after every, for example 30 seconds, to describe the videoqos delivery status. In accordance with an embodiment, the events may include network flow variables, device information, user and group information, or information on an application (e.g., resource condition, variables and custom triggered events). An event typically represents a message, token, count, pattern, value, or marker that may be recognized within a NRT data stream, such as network traffic, specific error conditions or signals, thresholds crossed, counts accumulated, and so on.

The data pipeline service 106a may be defined as a sequence of operations performed on a group of event tuples from one or more near real-time (NRT) data streams. In one implementation, the group may be formed on a tuple-by-type basis. In another implementation, the group may be formed on batch-by-batch basis. In some implementations, each data pipeline service may be identified by a unique data pipeline ID. In one implementation, multiple NRT data streams can source data to one or more data pipeline services. In another implementation, an NRT data stream is queued to a task sequence in a single pipeline, which in turn is processed over a single container.

In accordance with an embodiment, the video optimization and monitoring system 106 may correspond to a stream processing framework that may be defined as a real-time stream processing system. In accordance with an embodiment, the stream processing framework may process NRT data streams to generate real-time analytics. The stream processing framework may be built using APIs (application programming interfaces) and deployed as a cluster, referred to as a container. The container may be designed to manage distribution of tasks within a given infrastructure and the API may be designed to handle message passing, task discovery and fault-tolerance.

The ancillary service 132 may be configured to report events to the video optimization and monitoring system 106 for further analysis. In accordance with an embodiment, the ancillary service 132 may be executed on one or more servers or other hardware with like capability to serve up network data to the client computing device 108a, as well as observe interactions with a client application 109. For example, the ancillary service 132 may serve up network pages to the client computing device 108a or data used to generate user interfaces in a dedicated application. As the ancillary service 132 serve up the network data to the client computing device 108a, the ancillary service 132 may be configured to observe when a user manipulates a button in a user interface, or performs another type of action, such as playing a movie. Based on such interactions, the ancillary service 132 may be configured to communicate a base event 111 to the video optimization and monitoring system 106 describing an interaction with the client application 109 as soon as it is identified, or shortly thereafter.

The ancillary service 132 may communicate the base event 111 to the video optimization and monitoring system 106 over a network that may include, for example, the Internet, intranets, extranets, wide area networks (WANs), local area networks (LANs), wired networks, wireless networks, other suitable networks, or any combination of two or more such networks. For example, such networks may comprise satellite networks, cable networks, Ethernet networks, and other types of networks. In accordance with an embodiment, the tasks performed by each respective ancillary service 132, such as serving the content to the client application 109, may be independent and disconnected of the tasks performed by other ancillary services for other client computing devices. In accordance with an embodiment, the ancillary service 132 may be executed on the client computing device 108a, for example, as a component of the client application 109. In accordance with another embodiment, the ancillary service 132 may be executed as a standalone application.

For a given ancillary service 132, the base event 111 generated may be in a format different from other base events generated by other ancillary service. As the ancillary service 132 operate independently, the ancillary service 132 may generate the base event 111 in a disparate format. For example, the ancillary service 132 may communicate the base event 111 in a JavaScript Object Notation (JSON) format while another ancillary service may communicate the corresponding base event in an XML format. Additionally, data structure for the base event 111 may vary from one ancillary service to another.

The databases 134 may provide a data feed, such as reference extract pattern, to the content distribution and optimization system 102. Such data feed may be utilized for subscription data, catalog data where the source system does some modifications and databases 134 publish a change log to the centralized S3 bucket.

The third-party systems 136 may correspond to third party marketing systems, ad-serving platforms, such as Free-wheel®, or third-party content catalogs for which the content distribution and optimization system 102 is a bearer and the other system may pull in the information for augmentation.

The source connectors 138 may comprise suitable logic, circuitry, and/or APIs that may be configured to receive data from the databases 134 and the third-party systems 136 to provide data enrichment to the data streams in the messaging bus 172.

The serializer controller 140 may comprise suitable logic, circuitry, and/or APIs that may be configured to act as an HTTP collection end point or service for accepting the incoming traffic of events across various platforms, such as the ancillary service 132 either serving as a component of the client application 109 or serving as a standalone application communicatively coupled to the client application 109. In accordance with an embodiment, each event received from the client computing devices 108 may correspond to the base event 111. In an exemplary scenario, the schema of each base event 111 may correspond to raw JSON records. The serializer controller 140 may act as an ingress point and may be configured to flush each base event 111 as the raw JSON records to the cloud object storage, such as S3, on a periodic basis. Additionally, the serializer controller 140 may be configured to provide the raw JSON records to the messaging bus 172 also. The serializer controller 140 may perform various functions. For example, one function may be to ensure that each base event 111 that is being received, meet the credentials/dimensions that are expected. Another function may be to provide an authentication mechanism for the connecting client computing devices 108.

The DB Ingestion handler 142 may perform a transformation that receives the data feed from the databases 134 and the third-party systems 136 and normalizes the data feed to appear as enriched data for the plurality of enrichment layer clients 151 for consumption.

The restricted handler 144 is an internal handler that takes the data that was stripped off the PII and re-personalizes such data.

The depersonalized handler 146 may be similar to the restricted handler 144 except that it operates on depersonalized data, which is the data that is stripped off any personal identifiable information (PII).

The enrichment controller 148 may comprise suitable logic, circuitry, and/or APIs that may be configured to retrieve raw JSON records corresponding to the base event 111 from the serializer controller 140. The enrichment controller 148 may correspond to a post-processing layer that may be further configured to enrich or augment the raw event data, divide into small micro batch partitions, and save the enriched data set back out to cloud object storage. In accordance with an embodiment, the enrichment or the augmentation may pertain to geographic information about where the user's IP address belongs to. In accordance with an embodiment, the enrichment controller 148 may look up the information about the account and apply privacy compliance regulations to the events as such events flow through the enrichment controller 148. The enrichment controller 148 may further create a mechanism for which batch-based consumers may access the data.

The operational database 150 may correspond to a landing stage for the enriched data from the enrichment controller 148. In accordance with an embodiment, the videoqos heartbeats are allowed to get notified to the plurality of data consumers 161 when new raw event data is received by the operational database 150. Thus, the operational database 150 may correspond to a database where the content from the enrichment controller 148 and the DB Ingestion handler 142 collates in a time-ordered series and provides a single point for the plurality of enrichment layer clients 151 to extract the enriched data and apply the requisite transformations.

Various data exchange processes may be configured to retrieve one or more (or all) partitions of the enriched data set from the cloud object storage and forward the enriched data set to the plurality of enrichment layer clients 151, such as depersonalized 152, restricted 154, great lakes 156, devices 158, and application performance 160. The plurality of enrichment layer clients 151 may apply transformations on the enriched raw event data.

The depersonalized 152 may correspond to a transformation that may be configured to strip off the PII fields, such as user address, email, account ID, and the like, from the enriched raw events to allow one data consumer to access the data in depersonalized form. Thus, such PII is not spread to other analytical systems. Resultant transformation from the depersonalized 152 may be stored in the endpoint cloud data warehouse 162, such as Snowflake®.

The restricted 154 may be correspond to a transformation of the enriched raw events to utilize third-party services and allows to route the raw events to a marketing platform, such as Braze® or WANalytics®, for email and transactional delivery. Thus, the video data gets aggregated inside such third-party services that a marketing tool can control. Such transformation provides data in a format to have a direct access pattern to route data to third-party systems.

The great lakes 156 is a system that provides transformation of the enriched raw events to stored them in data lakes 166 that corresponds to a customer service tool to provide information to customer service agents. For example, the information may be when to call in for help support, whether or not the user watched the video, or whether or not the video was successfully played.

The devices 158 may correspond to a transformation that may extract device information from the enriched raw events and provide such device information to device database 168 for further insights. The device information may correspond to each of the client computing devices 108 and may further include characteristics, such as category, code, location, operating system version, serial number, manufacturer, rendering agent, and client ID corresponding to each of the client computing devices 108. Such information may be provided to the device database 168 for storage.

The application performance 160 may correspond to a transformation that may extract multiple performance parameters, associated with the client application 109 at each of the client computing devices 108, from the enriched raw events. Examples of such application performance metrics may include an application version, platform tenant code, product code, bootstrap version, application performance index (Apdex) score, average response time, error rates, request rate, CPU usage, uptime for service level agreements (SLAs), garbage collection, and the like. Such application performance metrics may be transmitted to the analytics and monitoring application 170 for monitoring and visualization.

As introduced above, the plurality of enrichment layer clients 151 may apply transformations on the enriched raw events. Thereafter, each of the plurality of enrichment layer clients 151 may route the metrics to corresponding endpoints. In accordance with an embodiment, such endpoints may correspond to the plurality of data consumers 161, such as the cloud data warehouse 162, the customer/client data platform 164, the data lake 166, the device database 168, and the analytics and monitoring application 170.

The cloud data warehouse 162 may comprise suitable logic, circuitry, and/or APIs that may be configured to store the enriched data and video model metrics in depersonalized form. In accordance with an embodiment, such data may be utilized to monitor playback failures by a client computing device when new features are rolled out, based on various metrics and data dimensions, such as Video Playback Failures, Device Type, Date, and the like. Such business value may be pertinent for a consumer business group, such as technical operations group. In accordance with another embodiment, such data may be utilized to obtain top titles viewed this week based on various metrics and data dimensions, such as Asset Name and Date. Such business value may be pertinent for another consumer business group, such as Content Insights group. In accordance with another embodiment, such data may be utilized to monitor peak concurrent usage by a specific region based on various metrics and data dimensions, such as Play Attempts, Exit Before Video Start, Video Start Failures, Area Partition (Location), Asset Name, Date. Such business value may be pertinent for another consumer business group, such as Leadership. In accordance with another embodiment, such data may be utilized to identify top 10 first viewed titles for marketing and engagement opportunities based on various metrics and data dimensions, such as User, Play Attempt, Asset Name, Date. Such business value may be pertinent for the consumer business group, such as Leadership. In accordance with another embodiment, such data may be utilized to identify changes in user behavior on content viewed and location indicating fraudulent account usage based on various metrics and data dimensions, such as Asset Name, Area Partition. Such business value may be pertinent for the consumer business group, such as Audit. An example of the cloud data warehouse 162 may be Snowflake® that is primarily a compute and storage platform for metrics and configured for subscription, reporting, viewership metrics, and the like.

The customer/client data platform 164 may correspond to a service or application that handles data governance, data integration and audience management. The customer/client data platform 164 allows the video optimization and monitoring system 106 to collect data on customers/clients from multiple touchpoints into one location through a single API. Such data may then be broken down into meaningful audiences and activated in a number of ways. The customer/client data platform 164 creates a single source of truth that may be accessed by all business units to boost productivity and decision-making speed. An example of such customer/client data platform 164 may be Segment®.

The data lake 166 may correspond to a centralized repository that allows to store all the structured and unstructured data at any scale and run different types of analytics—from dashboards and visualizations to big data processing, real-time analytics, and machine learning to guide better decisions. In accordance with an embodiment, such data may be utilized to support users that are not seeing content they are entitled to see based on various metrics and data dimensions, such as User, Asset Name, Area Partition (Location), Subscription Status, Date. In accordance with another embodiment, such data may be utilized to troubleshoot authentication errors due to payments to the purchase provider based on various metrics and data dimensions, such as User, Asset Name, Area Partition (Location), Subscription Status, Date. In accordance with another embodiment, such data may be utilized to identify user issue with playback when switching devices by version based on various metrics and data dimensions, such as User, Play Attempt, Device. Such business values may be pertinent for the consumer business group, such as Customer Experience.

The device database 168 may correspond to a repository that stores data corresponding specifically to the client computing devices 108. Various dimensions of each client computing device may be stored in the device database 168. Examples of such dimensions may include, but not limited to, device ID, application launch time at each client computing device, device type, deviceLocale, deviceModel, deviceOsVersion, and the like. In accordance with an embodiment, such data may be new feature usage and success by device measured by client platform teams based on various metrics and data dimensions, such as Play Attempt, Device. Such business values may be pertinent for the consumer business group, such as Product Engineers. Examples of such device database 168 may include, but are not limited to, Wireless Universal Resource File (WURFL), User Agent Profile (UAProf), Windows Management Instrumentation Device Driver Record (MWI DDR), or other device database.

The analytics and monitoring application 170 may correspond to a platform or service that is configured to monitor time-series data analysis and interactive visualization. An example of the analytics and monitoring application 170 may correspond to Grafana®, Graphite®, or an integration thereof according to which Graphite® may be connected to Grafana® to build a dashboard based on the collected metrics. As standalone applications, Grafana® is a multi-platform open source analytics and interactive visualization web application that provides charts, graphs, and alerts for the web when connected to supported data sources. Graph-ite® is also a highly scalable real-time graphing system. Numeric time-series data received by Graphite® may be stored specialized database that may be visualized through corresponding web interfaces. Graphite® is strong in time-series metrics collection, but Grafana® provides a more advanced solution for data analysis and visualization. In accordance with an embodiment, hosted analytics and moni-toring application 170, such as Graphite®, may receive StatsD and act as a configurable backend service. StatsD is a network daemon that listens for statistics, such as counters and timers, associated with the events and performs aggre-gation of such data, then sends it on to the hosted Graphite®. In accordance with an embodiment, such data may be utilized to scale our services based on concurrent viewership volume based on various metrics and data dimensions, such as Concurrency. Such business value may be pertinent for a consumer business group, such as Infrastructure.

The messaging bus 172 may comprise suitable logic, circuitry, and/or APIs that may be configured to provide pub/sub event store with configurable topics and high throughput for an end-to-end event streaming solution. Stated differently, the messaging bus 172 may be configured to publish (write) and subscribe to (read) streams of events, including continuous import/export of data from other sys-tems, store streams of events durably and reliably for desired time duration, and process streams of events as they occur or retrospectively. An example of such a messaging bus may be Kafka® that is a distributed, highly scalable, elastic, fault-tolerant, and secure platform for event streaming.

Within the messaging bus 172, the events may be orga-nized and durably stored in topics that may be multi-producer and multi-subscriber. The topics may be parti-tioned, i.e. spread over a number of "buckets" located on different Kafka® brokers (servers that form the storage layer). When a new event is published to a topic, it is actually appended to one of the topic's partitions. Events with the same event key (e.g., a device ID) may be written to the same partition, and Kafka® guarantees that any consumer of a given topic-partition will always read that partition's events in exactly the same order as they were written.

In accordance with an embodiment, Kafka® may provide scaling in terms of three adjustable parameters, i.e., data volume inbound, data volume outbound and concurrency on a per-topic basis. Such parameters may be tuned by scaling both up and out. If the concurrency limit is reached, brokers may be sized up to support higher throughput, and if producers or consumers are over taxed, concurrency limits may be increased to support more processes. A single Kafka® cluster may be scaled via such parameters to support multiple disjoint workloads (on a per-topic basis). The shard owner election and checkpointing (resume after failure) mechanisms are part of the messaging platform and built into the API clients in Kafka® via consumer groups. Thus, Kafka® supports built-in data consumers in addition other data consumers that match current consumer patterns, such as Spunk®, Flink®, Snowflake®, Cassandra®, DynamoDB® and the like.

The cloud object storage may comprise suitable logic, circuitry, and/or APIs that may be configured to provide an object storage service. An example of such cloud object storage may be Amazon S3 that offers scalability, data availability, security, and performance for virtually any use case, such as data lakes, cloud-native applications, and mobile apps. The basic storage units of Amazon S3 are objects which are organized into buckets. Each object may be identified by a unique, user-assigned key. Buckets may be managed using either the console provided by Amazon S3, programmatically using the AWS SDK, or with the Amazon S3 REST API. Additionally, objects can be downloaded using, for example the HTTP GET interface and the BitTor-rent® protocol.

The first metrics aggregation engine 174*a* and the second metrics aggregation engine 174*b*, collectively referred to as the metrics aggregation engine 174, may comprise suitable logic, circuitry, and/or APIs that may be configured to aggregate the real-time and high-volume stream of enriched raw events, for example videoqos metrics, from the mes-saging bus 172 based on a given business logic. An exem-plary metrics aggregation engine 174 may be Apache Flink® that is a framework and distributed processing engine for stateful computations over unbounded and bounded data streams. Apache Flink® is an open source system that derives health metrics of the content distribution and optimization system 102 using a set of SQL aggregation queries or datastream APIs.

In accordance with an embodiment, the first metrics aggregation engine 174*a* may be configured to perform the videoqos metrics aggregation in a stream by using Flink® hosted in Amazon's Kinesis® Analytics platform. Accord-ingly, existing Snowflake® based modelling logic may be ported to real-time stream allowing direct access to state changes for various core entities, that include, for example, video streams, sessions (i.e. current state of a user within an ongoing application session), users (i.e. activity, lifecycle and preference data about users and subscriptions (i.e. error rates, lifecycle data, conversions, and charge failures). More specifically, Flink® job is deployed at the first metrics aggregation engine 174*a* and serves as Kafka® topic sink to perform stateful aggregation of videoqos raw events to generate for example, video playback failure, video start failure, number of seconds to start video playback, number of rebuffering events emitted, and the like. The Flink® job which may be deployed as the first metrics aggregation engine 174*a* then publishes sessionalized videoqos metrics topic back in the messaging bus 172. Thus, the stateful aggregations may be replicated in discrete change log form into their respective Kafka® topics so that they can be the central source for real time applications, such as Grafana monitoring, Watch list, Continue Watching, Real Time Sys-tem dashboards, CDN Scoring and the like. In accordance with an embodiment, the existing Raptor definitions devel-oped in corresponding Flink® instance may be leveraged for specific videoqos definitions to cut down on development time.

In accordance with another embodiment, the second met-rics aggregation engine 174*b* may be configured to perform CDN scoring based on the sessionalized videoqos metrics topic published by the first metrics aggregation engine 174*a*. Thus, the scoring of the CDN is performed to directly subscribe to updates about aggregated business metrics to service the prioritized list in near real-time about which CDNs are performant according to defined business logic. The second metrics aggregation engine 174*b* may be an additional job package inside the metrics aggregation engine 174 that rights out to a Kafka® topic to be consumed both by Grafana® and the CDN selector 182. The additional Flink® job which may be deployed at the second metrics aggregation engine 174*b* then publishes CDN scoring metrics topic back in the messaging bus 172. In an exemplary scenario, the second metrics aggregation engine 174*b* may use an Exponentially Weighted Moving Average algorithm to trigger metric score updates.

The analytical search engine 176, which serves as Kafka® sink, may comprise suitable logic, circuitry, and/or APIs that may be configured to provide a distributed, multitenant-capable full-text search engine with an HTTP web interface and schema-free JSON documents. An example of such analytical search engine 176 may be Elasticsearch®. Existing Grafana® dashboard 178*b* may be leveraged and alarms are routed to the incident management software 178*c*, such as VictorOps®, that pulls in data from other sources, such as log management, monitoring, and chat tools to provide a single, unified view into the health of the content distribution and optimization system 102. Further, the graphic authoring tool 178*a*, such as Raptor® Visualization and templates, may be leveraged or the analytical and visualization templates 178*b*, such as Grafana® templates, may be reused, and the existing Irond/Statsd Grafana® source connection may be utilized. The messaging bus 172 may write a stream consumer of the same videoqos metrics topic published by the first metrics aggregation engine 174*a*, also being computed for CDN Scoring. In accordance with an embodiment, if the Elasticsearch® is selected, a default Kafka® sink connector, such as Kafka® Connect JDBC Sink connector, may be leveraged for ingesting the data. If the Irond/Statsd is selected, a custom sink may be required that may leverage the existing enrichment layer consumer logic for perf-timings.

The comet 180 may be a a web application model in which a long-held HTTPS request allows the client application 109 to push data to the CDN selector 182, without the CDN selector 182 explicitly requesting it. In accordance with an embodiment, the user associated with the client computing device 108*a* may initiate a play event on an asset, such as a VOD asset. Accordingly, the comet 180 may further provide playback URL request for [device type] [stream protocol] and video metadata to the CDN selector 182. Various examples of the comet 180 may include, but are not limited to, Ajax Push, Reverse Ajax, Two-way-web, HTTP Streaming, and HTTP server push among others.

The CDN selector 182 may comprise suitable logic, circuitry, and/or APIs that may be configured to perform CDN switching decision in accordance with an HTTP based mechanism. The CDN selector 182 may perform real-time CDN selection and routing based on the video metadata received from the comet 180 and the various dimensions within the videoqos metrics, such as autonomous system number (ASN), package type, DMA, device type, product code, and tenet, received from the CDN selector database 184. In accordance with an embodiment, the CDN selector 182 may be configured to perform CDN distribution, priority setting, and business routing rules from a centralized location with the ability to configure CDN key IDs, default weighting of each CDN per rule, and applying business rule per key, such as CDN ID, CDN name, video profile encoding, device, video type, and the like.

In accordance with various embodiments, the CDN selector 182 may comprise the default CDN routing configuration. It may avoid the potential of a CDN provider that has not been configured in one or the other system causing an incongruence between various systems. Further, the CDN selector 182 may override the database driven values that are configured via user interface (UI) tool. This will reduce the need to manually deploy service updates as CDN providers are added or removed from the network environment illustrated in block diagram 100A. Further, a CDN may be overridden based on Rebuffering Rate and Video Start Failures by consuming Kafka® videoqos Decision metrics and building a simple threshold for changing default routing weightings between various CDNs.

In accordance with an embodiment, the CDN selector 182 may be configured to return a prioritized list of CDNs to the client computing device 108*a* so that the client computing device 108*a* may try a client side fallback pattern in case the video attempt fails.

The CDN scoring database 184 may comprise suitable logic, circuitry, and/or APIs that may be configured to serve as Kafka® sink to read from live CDN scores and store in a distributed database. A kstream table consumer may be set up to prevent ingress cost from ballooning by sampling updates rather than every score change. CDN scoring database 184 may be configured based on AWS DynamoDB/Apache Cassandra.

The session inspection controller 186 may comprise suitable logic, circuitry, and/or APIs that may be configured to query for video player session IDs and check the behavior of the video player for multiple use cases, such as validating new client instrumentation, debugging issues within a video session, and regression testing when client functionality has changed. The session inspection controller 186 is access restricted by role.

The ESV 188 may correspond to a component of the enrichment controller 148 that may be configured to receive the raw video events from the messaging bus 172 and redo enrichment of the raw video events to get the geographic information about IP addresses, DMA, marketing area, and the like into the raw video event itself. The ESV 188 may further provide message validation and schema for the raw video events. Once enriched, validated and structured, the raw video events may be provided back to the messaging bus 172.

Figure 2:
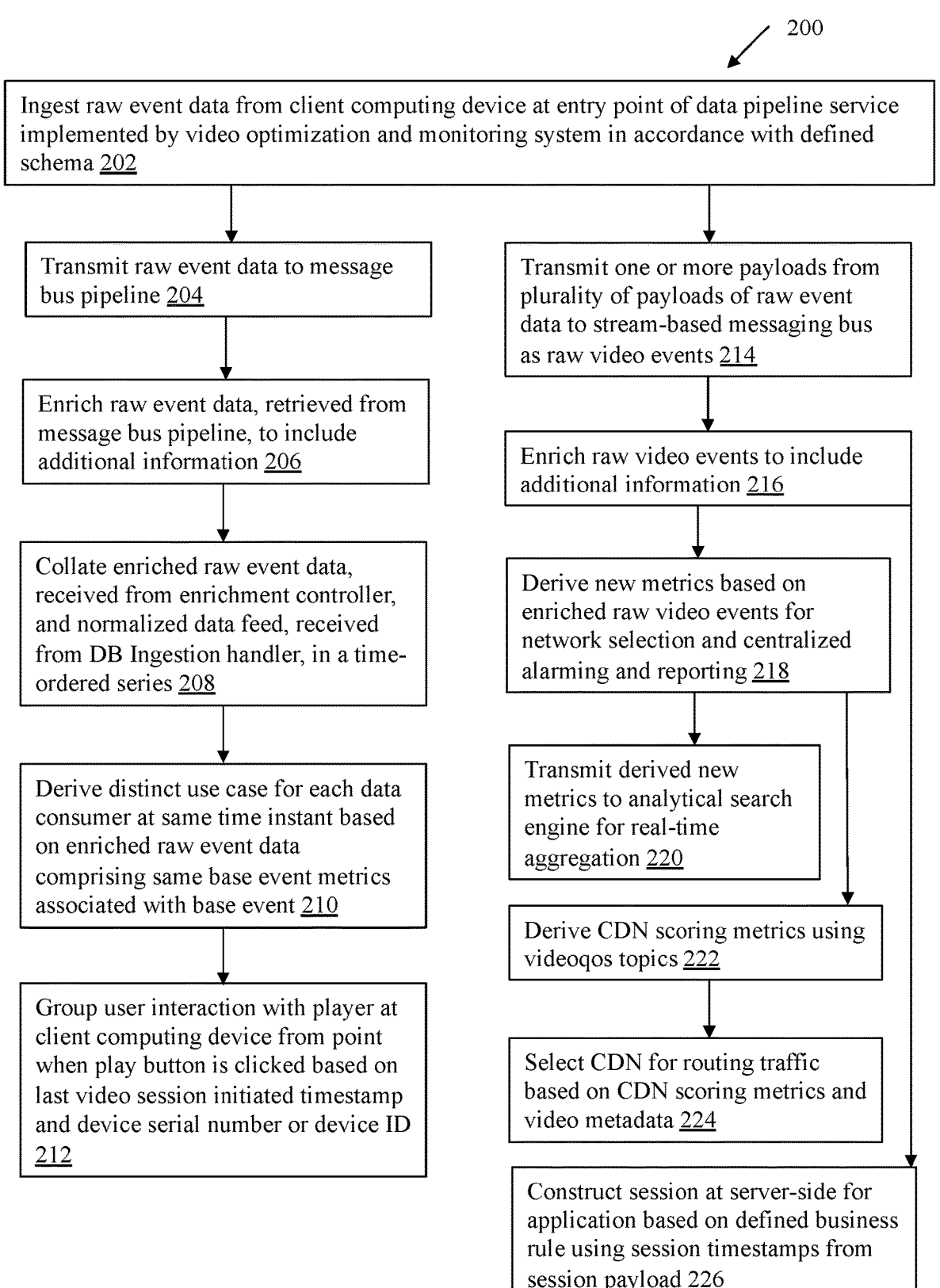
FIG. 2 depicts a flowchart for deriving new metrics and multiple use cases of data consumers using base event metrics, in accordance with an exemplary embodiment of the disclosure.

FIG. 2 depicts a flowchart 200 for deriving new metrics and multiple use cases of data consumers using base event metrics, in accordance with an exemplary embodiment of the disclosure. FIG. 2 is described in conjunction with FIGS. 1A, 1B, 3A, 3B, and 4A to 4D.

At 202, raw event data may be ingested from a client computing device at an entry point of the data pipeline service 106*a* in accordance with a defined schema. In accordance with an embodiment, the serializer controller 140 may be configured to ingest the raw event data from a client computing device, such as the client computing device 108*a*, at the entry point of the data pipeline service 106*a* implemented by the video optimization and monitoring system 106 in accordance with the defined schema.

Prior to the ingestion, various events may be generated at the client computing devices 108 as the video content, received from the content distribution system 104, is being played at the client computing devices 108 using the client application 109, such as DTC apps. An event may be an identifiable unit of data that conveys information about an occurrence. An event may have a timestamp indicating when the event occurred, a set of dimensions indicating various attributes about the event, and a set of metrics related to the event.

In accordance with an embodiment, the events may correspond to user-generated events, such as, but not limited to, starting, pausing, resume, or stopping the play out of the video content based on the manipulation of the software buttons (displayed at the user interface of the client application 109), manipulation of hardware buttons (provided at an input device, such as keyboard, of the client computing device 108*a*), or voice commands (provided at an input device, such as microphone, of the client computing device 108*a*).

In accordance with another embodiment, the events may include network flow variables, erroneous occurrences, device information, user and group information, or information on an application (e.g., resource condition, variables and custom triggered events). An event typically represents a message, token, count, pattern, value, or marker that may be recognized within a NRT data stream, such as network traffic, specific error conditions or signals, thresholds crossed, counts accumulated, and so on.

In accordance with another embodiment, the events may correspond to system-generated events, such as heartbeat events that are fired at regular intervals, for example every 30 seconds, to describe the videoqos delivery status. Examples of such heartbeat events may include, for example, streamInitiate (indicating that the play has been initiated and the stream has been requested), videoqosstart (indicating that the video content has started successfully playing), videoqosstatechange (indicating that video content type is changing from main asset to an ad asset), videoqoserror (indicating that an error has occurred in the video), videoqossend (indicating that the video has been sent), and the like.

In accordance with an embodiment, the ancillary service 132 may be configured to generate a base event 111 in response to one or more events generated at the client computing device 108*a*. The base event 111 may be generated at regular intervals and/or upon occurrence of the one or more events. The base event 111 may be in accordance with a defined schema, such as JavaScript Object Notation (JSON) schema. JSON is a lightweight data-interchange format, easy for users to read and write and equally easy for machines to parse and generate. JSON is built on two structures namely a collection of name/value pairs, and an ordered list of values. In accordance with an embodiment, the ancillary service 132 may be executed on the client computing device 108*a*, for example, as a component of the client application 109. In accordance with another embodiment, the ancillary service 132 may be executed as a standalone application. Based on the interaction with the client application 109 in the client computing device 108*a*, the ancillary service 132 may be configured to communicate a base event 111 to the video optimization and monitoring system 106 describing an interaction with the client application 109 as soon as it is identified, or shortly thereafter.

In accordance with an embodiment, the base event 111 may be associated with base event metrics. In accordance with various examples, the base event metrics may comprise at least an application metric, a device metric, a session metric and an actual heartbeat metric to provide the distinct use case for each data consumer from the plurality of data consumers 161.

The base event 111 thus generated by the client application 109 of the client computing device 108*a* may be transmitted to the entry point of the video optimization and monitoring system 106. The entry point may correspond to an HTTP collection end point or service in the data pipeline service 106*a* for accepting the incoming traffic of events across various platforms, such as the client application 109 or the ancillary service 132 (which is either serving as a component of the client application 109 or serving as a standalone application communicatively coupled to the client application 109).

The serializer controller 140 may act as an ingress point and ensure that each base event 111 that is being received, meet the credentials/dimensions that are expected. The serializer controller 140 may further provide an authentication mechanism for the connecting client computing devices 108. In accordance with an embodiment, the base event 111 may comprise a plurality of payloads. Each payload may comprise a first set of dimensional properties provided by the client computing device 108*a* and/or a second set of dimensional properties, such as serverTimeutc (Event Payload), hurleyProfileID (VisitorIdentity Payload), a clientIpAddr (Session Payload), added by the serializer controller 140 at the entry point when the second set of dimensional properties is not available with the client computing device 108*a*. The addition of the second set of dimensional properties by the serializer controller 140 at the entry point may correspond to the mechanism of server-side enrichment. In accordance with an embodiment, one or more of the plurality of payloads may include a set of timestamps.

Each of the first and the second sets of dimensional properties may correspond to logically grouped attributes and corresponding data values. Each of such context objects with payloads and different dimensional properties may allow to reuse the individual heartbeats in the base event 111 to derive various use cases, such as a customer service tool use case, a content reporting use case, a quality of delivery use case, and a watchlist markers use case. Different contextual payloads may allow to construct metric definition as per the consumer need. Stated another way by different example, one payload, such as a device payload, may allow to reconstruct activity or quality of delivery across any of the device dimensions. Another payload, such as the application payload, may allow to buy a version of the software. When the dimensional properties are combined with timestamps from the session payload, different use cases of data consumers may be serviced instantaneously on the server-side rather than having to emit a unique event per data consumer.

In accordance with an embodiment, one of the plurality of payloads may correspond to an application payload comprising the first set of dimensional properties. The first set of dimensional properties in the application payload may include attributes associated with a version of an application software, i.e. the client application 109, installed on the client computing device 108*a*. Additionally, the application payload may include other attributes associated with the product code, bootstrap version, minimum native development kit (NDK) and platform tenant code associated with the version of the application software. An exemplary application payload is illustrated as:

```
"App":{
  "appVersion": "hbogo-qa-fvt-hurley-prod-ios-tablet-master.27.0.0.0",
  "platformTenantCode": "hboTve",
  "productCode": "hboMax",
  "bootstrapVersion": "",
  "Minimum NDK Version": ""}
```

In accordance with an embodiment, one of the plurality of payloads may correspond to a device payload comprising the first set of dimensional properties. The first set of dimensional properties may include attributes associated with the client computing device 108*a*. An activity or a quality of delivery may be reconstructed across the attributes included in the device payload. Examples of such attributes may include device name, device code, device location, device serial number, OS version, rendering agent and client id. An exemplary device payload is illustrated as:

```
"Device": {
"device": "device used by client such as apple tv", 'Apple iPhone
XS'
"deviceLocale": "en_US",
"deviceSerialNumber":
"gulEyItMhGk/vkLuHV2h7DmBvOQ7pbLQy9CBhSuQUV4=",
"manufacturer": "Apple",]
"osVersion": "13.3.1",
"rendering_Agent":
"client_id": }
```

In accordance with an embodiment, one of the plurality of payloads corresponds to a session payload comprising the first set of dimensional properties. The first set of dimensional properties may include attributes associated with an application launch timestamp associated with the base event 111. The first set of dimensional properties may further include attributes associated with session ID, authentication state change timestamp, profile selected timestamp, and last video initiated timestamp.

In an exemplary scenario, as soon as the client application 109 is fired in the whole day, the application launch timestamp in the base event 111 indicates that the session has started. This dimensional property is sent with every step of events that are fired by the client application 109. Accordingly, when it is determined that how many minutes of video has been watched as the base event 111 sent 30 seconds segment of video. Thus, every 30 seconds segment of the video that was sent may be associated back to the initial timestamp when the play event was fired or when the client application 109 was watched. Thus, the application launch timestamp in the session payload of the base event 111 may be utilized to aggregate the data, for example the multiple 30 second segments of the video, at different categorical levels.

In accordance with an embodiment, session ID may be initiated when the client application 109 is launched firstly relative to SDK that is supposed to hold consistently as long as there is some user activity, similar to a shopping cart. Generally, the session ID may reset as a user brings the client application 109 back from backgrounding while using multiple platforms. This may result in inconsistent metrics being emitted from the client computing device 108*a*. In accordance with an embodiment of the present disclosure, a session may be constructed on the server-side, i.e. at the content distribution and optimization system 102, based on any business logic as desired. In accordance with the above exemplary scenario, it may be 30 seconds between such timestamps or an hour of activity between such timestamps, a session may be constituted. Thus, the session timestamp dimensional properties are unique to the proposed payload which allow to reconstruct customer activity of such metrics that are being emitted in any shape or any timestamp that is defined on the business side. The client computing device 108*a* may be required to reemit new metrics, get ingested or have difference between the behavior on the client-side. An exemplary session payload is illustrated as:

```
"Session":{
"sessionId": "",
"application_launch_timestamp": "",
"Authentication_state_change_timestamp": "",
"Profile_seletected_timestamp": new field;
https://jira.dp.hbo.com/browse/DA-2268 and
https://jira.dp.hbo.com/browse/DA-2269
"Last_video_initiated_timestamp": ""}
```

In accordance with an embodiment, one of the plurality of payloads corresponds to a referral payload comprising the first set of dimensional properties. The first set of dimensional properties may include attributes associated with a user pathname. This pathname may correspond to a link in an email that launches the client application 109. An exemplary referral payload is illustrated as:

```
"Referral":{
referralURL: get example, new field; search term }
```

In accordance with an embodiment, one of the plurality of payloads may correspond to a visitor identity payload comprising the second set of dimensional properties. The second set of dimensional properties may include attributes associated with user properties added by the serializer controller 140 at the server-side. In accordance with an embodiment, this base event metric may be utilized to derive continual watching playback. This base event metric may tie viewership to the account of the client computing device 108*a*, thus, when the customer service is called, it may ascertain that what the user watched, how long did the user watch, and when was the last issue occurred. Further, the advertising ID is important for ad attribution. Other fields, such as Hurley account may be an internal field. An exemplary visitor identity payload is illustrated as:

```
"VisitorIdentity": {
"clientIpAddr": IP address of the client computing device 108a <<added
by telegraph>>
"Anonymous Visitor ID": "" , hurley token service ; hadron hotline
"advertisingID"
"hurleyAccountId" :
"userId":
"businessId":
"hurleyProfileID":}
```

In accordance with an embodiment, one of the plurality of payloads may correspond to an event payload comprising the first and the second sets of dimensional properties. The first set of dimensional properties may include a type of the event, a subtype of the event, and a client timestamp. The second sets of dimensional properties may include a server timestamp added by the serializer controller 140 at server-side. The set of timestamps may comprise the client and the server timestamps.

In accordance with an embodiment, the event payload may comprise individual markers that may indicate that a 30 second segment video was watched that may derive every other metrics or minutes watched, or whether it is a video playback failure or some other state. The event payload may include type and subtype of events that may vary depending on the desired business logic. For example, for videoqos as the event type, the subtype may correspond to videoqos heartbeat that sends marker every 30 seconds to indicate that the user is still proceeding through the client application 109 and hasn't experienced an error. An example of the subtypes of videoqos may include a videoqosstart, as illustrated below in an exemplary event payload. However, there may be other subtypes, such as, videoqosstatechange, videoqosbitratechange, heartbeat, and videoqossend, not shown here for brevity. Similarly, in addition to videoqos, there may be other types of events, such as streamInitiate, error, and the like, that have different subtypes. The application heartbeat may fire periodically using the same properties that allows to reconstruct the session data to indicate that the application is still alive. There are other sub type events, such as activate, activation timeout, deactivate, deeplink, and exception, that occur to indicate when the application was launched, when there was an error, when the user timed out, did the user resumed the application from a phone call.

An exemplary event payload is illustrated as:

```
"Event":{
"type": "videoqos",
"subtype": "videoqosstart"
"client_time_utc":"client timestamp providing time and client timezone",
"serverTimeUtc": "1581546226850 ", }
```

An exemplary VideoQoS event having the dimensional properties same as that of the base event 111 is illustrated as:

```
"VideoQoS": {
"viewableId":"eg urn:hbo:episode:GVU2p5A41x4NJjhsJAUyP",` "cdn":,
"cutId":,
"duration":"number in seconds",
"seriesName": "e.g. Curb Your Enthusiasm",
"title": "Running with the Bulls",
"episodeNumber": 4,
"eventSource": "hadron",
"fullDevice": "AppleTV6,2",
"fullSeasonTitle": "Season 9",
"fullTitle": "Episode 4 - Running with the Bulls",
"isLoggedIn": boolean, "isDownloaded":boolean, "profile":
"PRO11_VIDEO", "startFromBeginning": boolean, "uri":"",
"playlistId":
"playItemType": PROMO/MAIN "promoId":
"playlistDuration":
}
```

Videoqos event may be associated with videoqos event metrics that correspond to the video being played at the player of the client computing device 108a. Examples of such videoqos event metrics may include, but not limited to, streamInitiate, texttrackchanged, videoqosaudiostate, videoqosbitratechanged, videoqoschromecaststart, heartbeat (the event that tracks event performance when no other event is occurring) and the like.

An exemplary stream initiated event is illustrated as:

```
"type": "videoqos",
"subtype": "streamInitiate",
"timeStamp": "Last_video_initiated_timestamp"
```

```
"assetID": "<< id that tracks this as a starting event of
stream>>".
```

Figure 3A:
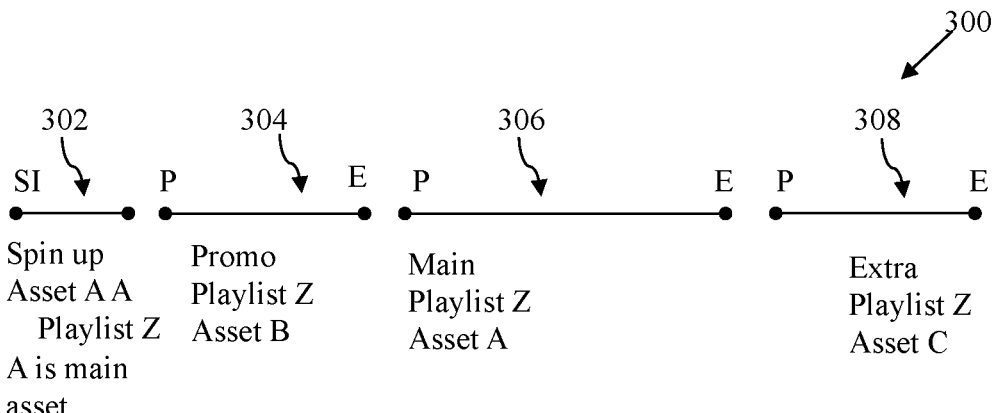
FIGS. 3A and 3B are diagrams that depict heartbeat events in different scenarios, in accordance with an exemplary embodiment of the disclosure.

On video play requests, a streamInitiate event indicates that the user has initiated a stream request. This is before the videoqosstart event which indicates video has actually started. On request for each main asset, a new streamInitiate event may be generated. When the user selects a video to be played, initial streamInitiate event with main assetID may be generated, as illustrated in FIG. 3A. If the next main asset is played as part of auto play/continues watching, a new streamInitiate event will be generated, as illustrated in FIG. 3B.

With reference to FIG. 3A, there is illustrated a stream 300 that includes a spin up 302, a promo 304, a main asset 306, and an extra 308. The stream 300 may correspond to a video content being played according to a playlist "Z" comprising the main asset 306 as "Asset A", the promo 304 as "Asset B", and the extra 308 as "Asset C". A streamInitiate event "SI" is generated during the spin up 302 as the user selects a video to be played. The spin up 302 declares the main asset 306 as "Asset A" in the playlist "Z". Following the spin up 302, the promo 304, the main asset 306, and the extra 306 is played, each including a play event "P" triggered at the start and an end event "E" triggered at the end.

Figure 3B:
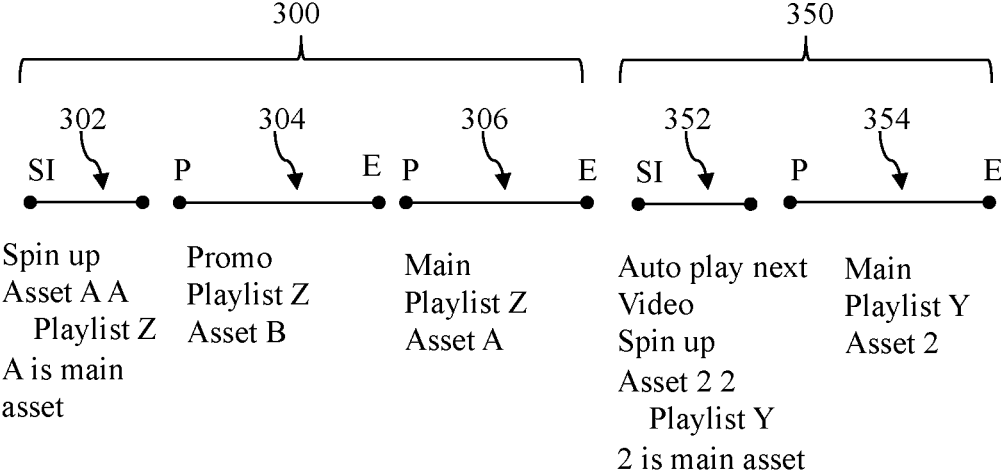

With reference to FIG. 3B, there are illustrated a new stream 350 in addition to the stream 300, such that the new stream 350 comprises the next main asset that is played as part of auto play/continues watching. In addition to the spin up 302, the promo 304, the main asset 306, as already described in FIG. 3A, there is further illustrated spin up 352 and a new main asset 354. Another streamInitiate event "SI" is generated during the new spin up 352 as the new video is auto played. The new spin up 352 declares the new main asset 354 as "Asset 2" in the playlist "Y". Following the spin up 352, the new main asset 354, is played that includes a play event "P" triggered at the start and an end event "E" triggered at the end.

The heartbeat may correspond to an application heartbeat (or a video heartbeat). Different sets of analytical data may be derived for each consumer service at a same time instant based on the application heartbeat (or the video heartbeat). It should be noted that the basic attributes of the heartbeat subtype of the event remain the same irrespective of the corresponding event. An exemplary heartbeat subtype of an event is illustrated as:

```
"HeartBeat":{
"previousVideoPosition":"<<seconds into video play heartbeat started/ end of last heartbeat>>"
"currentVideoPosition":"<<seconds into video play heartbeat ended. If heartbeat is triggered
every 30 seconds, previousVideoPosition would be 30 seconds, currentVideoPosition would be
60 seconds. Next heartbeat would be previousVideoPosition, i.e. 60 seconds and
currentVideoPosition would be 90 seconds>>",
"previousPlaylistPosition": "<<seconds into playlist (promo + video + extra) heartbeat started/
end of last heartbeat>>",
"currentPlaylistPosition":"<<seconds into playlist heartbeat ended. If heartbeat is triggered
every 30 seconds, previousPlaylistPosition would be 30 seconds, currentPlaylistPosition would
be 60 seconds, Next heartbeat would be previousPlaylistPosition, i. e. 60 seconds, and
currentPlaylistPosition would be 90 seconds>>",
"streamWatchDuration": "<<total seconds watched in playlist/stream>>",
"trigger":"<<watching/end/rewind/forward/pause/abruptend>>".
}
```

In accordance with an embodiment, the heartbeat event may be triggered when the user associated with the client computing device 108*a* initiates actions or the client application 109 events. There may be multiple exemplary scenarios, which are illustrated in FIGS. 4A to 4D describing user initiated actions or client application 109 events that may send a heartbeat event with respect to a video stream being initiated at the client computing device 108*a* for the user.

The video stream may comprise multiple events linked to the user of the client computing device 108*a* streaming a main asset. Any promo or extra shown when the user clicks on the main asset are part of that video stream. Examples of such events may include, "SI" represents streamInitiate event, "P" represents play event, "E" represents end event, and "H" represents heartbeat event. When binge watching, each main asset is a separate stream. When spinning up each main asset, a streamInitate event is triggered.

Figure 4A:
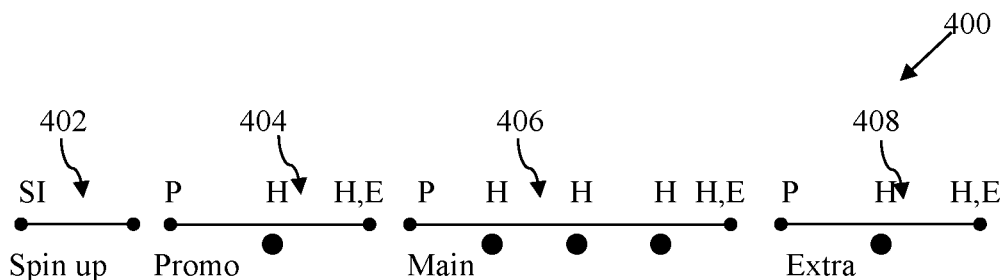
FIGS. 4A through 4D depict video play event in different scenarios, in accordance with exemplary embodiments of the disclosure.

In an exemplary scenario illustrated in FIG. 4A, there is shown a video stream 400 that comprises a spin up 402, a promo 404, a main asset 406, and an extra 408. The spin up 402 may include a streamInitiate "SI" event triggered when the user initiates the video stream 400. The promo 404 may include a play event "P" triggered at the start, a heartbeat event "H" and an end event "E" triggered at the end, and another heartbeat event "H" triggered in the middle. The main asset 406 may include a play event "P" triggered at the start, a heartbeat event "H" and an end event "E" triggered at the end, and three other heartbeat events "H" triggered at regular intervals while the main asset 406 is being played. The main asset 406 is further elaborated in FIG. 4B. The extra 408 may include a play event "P" triggered at the start, a heartbeat event "H" and an end event "E" triggered at the end, and another heartbeat event "H" triggered in the middle.

Figure 4B:
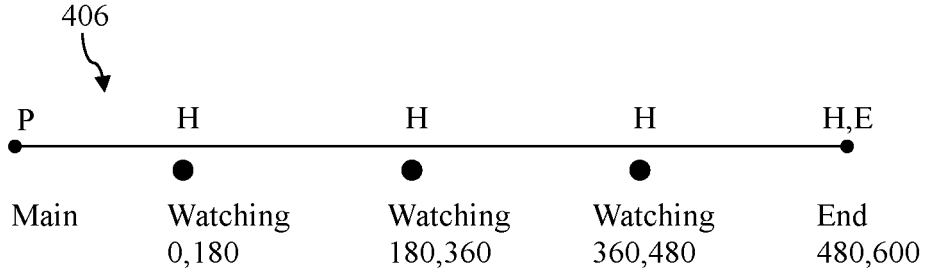

In FIG. 4B, there is shown the main asset 406 with watching heartbeats being triggered at various timestamps. The heartbeat events are triggered after every 180 seconds while the main asset 406 is being played. The attributes and corresponding data values of such events are:

1) Trigger: video start, Event: P, previousVideoPosition: 0, currentVideoPosition: 0
2) Trigger: watching, Event: H, previousVideoPosition: 0, currentVideoPosition: 180 For next heartbeat events, provided the user does not perform any action, the attributes and corresponding data values may be represented as:
3) Trigger: watching, Event: H, previousVideoPosition: 180, currentVideoPosition: 360
4) Trigger: watching, Event: H, previousVideoPosition: 360, currentVideoPosition: 480
5) Trigger: video end, Event: H and E, previousVideoPosition: 480, currentVideoPosition: 600

Figure 4C:
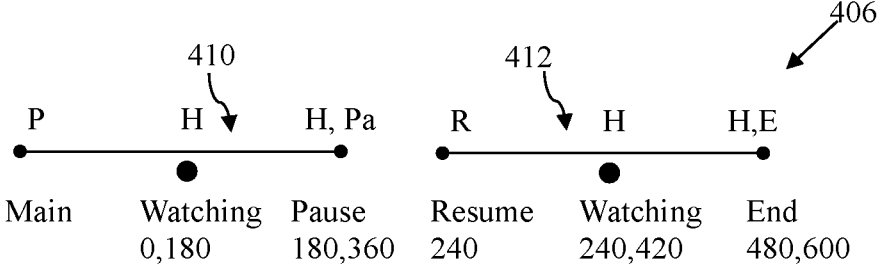

In FIG. 4C, there is shown the main asset 406 with a pause heartbeat resulting in two sub assets 410 and 412. The attributes and corresponding data values of such events are:

1) Trigger: video start, Event: P, previousVideoPosition: 0, currentVideoPosition: 0
2) Trigger: watching, Event: H, previousVideoPosition: 0, currentVideoPosition: 180
3) Trigger: pause, Event: Pa and H, previousVideoPosition: 180, currentVideoPosition: 240

On pause of the main asset 406, the heartbeat event in sub asset 410 may be flushed so far. If the prior heartbeat was sent at 180 seconds, and the user pauses at 240 seconds, sends the heartbeat with previousVideoPosition as 180 seconds and currentVideoPosition as 240 seconds. Next watching heartbeat in the sub asset 412 may be at 240 seconds.

4) Trigger: resume, Event: R, currentVideoPosition: 240

On resuming the main asset 406, heartbeat is started from that point. If the user paused at 240 seconds, heartbeat is flushed till then. After some time, the user resumes and the attributes and corresponding data values of the next heartbeat may be represented as:

5) Trigger: watching, Event: H, previousVideoPosition: 240, currentVideoPosition:420
6) Trigger: video end, Event: H and E, previousVideoPosition:420, currentVideoPosition:600

Figure 4D:
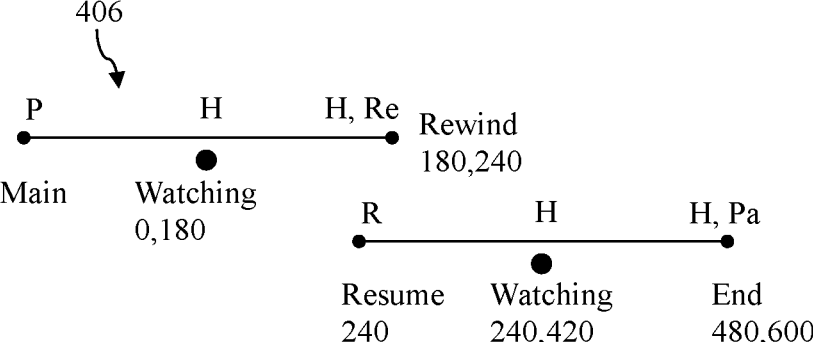

In FIG. 4D, there is shown the main asset 406 with rewind heartbeats. The attributes and corresponding data values of such events are:

1) Trigger: video start, Event: P, previousVideoPosition: 0, currentVideoPosition: 0
2) Trigger: watching, Event: H, previousVideoPosition: 0, currentVideoPosition: 180
3) Trigger: rewind, Event: Re and H, previousVideoPosition: 180, currentVideoPosition: 240

On rewind/forward of the main asset 406, the heartbeat is flushed so far, then start new "previousVideoPosition". The attributes and corresponding data values may be represented as:

If rewind was till 200 seconds, the attributes and corresponding data values of the next heartbeat may be represented as:

4) Trigger: resume, Event: R, currentVideoPosition: 200
5) Trigger: watching, Event: H, previousVideoPosition: 200, currentVideoPosition: 380

If the main asset 406 ends abruptly at 480 seconds, the attributes and corresponding data values of the next heartbeat may be represented as:

6) Trigger: abruptend, Event: H and E, previousVideoPosition:380, currentVideoPosition:480

In accordance with an embodiment, the heartbeat events may be tracked, and a user stream view may be created that includes information regarding a user, a client computing device, a video asset, seconds viewed, percent completed, start time, and end time. Further, various business KPIs also depend on such tracked heartbeats. Examples may include, but are not limited to, video_seconds_viewed (seconds viewed from the heartbeat event), total streamers (total distinct user_id/profile_id), average stream duration (sum (video_seconds_viewed)/count(stream_started) by date), number of streams per second (count(stream_started)/count (session_start) by date, productCode), streams per streamer (count(stream_started)/count(distinct userId) by date, productCode, userID), percentage of repeat streamers (count (distinct userId) by date, productCode), and average stream duration by title (average stream duration–video seconds watched for that stream). The control may pass concurrently to steps 204 and 214 for batch-based analytical processing and real time stream processing, respectively. As is described hereinafter, derivation of distinct use case for each data consumer at the same time instant corresponding to batch-based analytical processing and derivation of new metrics for network selection and centralized alarming and reporting corresponding to real-time stream processing may be based on at least the heartbeat event.

At 204, the raw event data may be transmitted to message bus pipeline, i.e. S3/SQS, for enrichment. In accordance with an embodiment, the serializer controller 140 may be configured to transmit the raw event data to the message bus pipeline, i.e. S3/SQS, for enrichment. The raw event data, comprising the first and the second sets of dimensional properties, and the set of timestamps, may be stored in the cloud object storage, i.e. S3, on a periodic basis for batch based analytical processing. In such an embodiment, the raw event data at the http ingress point, i.e. the serializer controller 140, may be paired with legacy message bus pipeline for data consumers for batch-based processing on mins/hours for aggregation on the data consumers.

In accordance with an embodiment, S3 may be integrated with a completely managed message queue service, such as Simple Queue Service (SQS), to realize the message bus pipeline, referred to as S3/SQS. Such a queue service may be utilized to decouple systems and services in the microservice architecture. Both S3 and SQS are software-as-a-services offered by Amazon® and form an integral part of applications exploiting cloud-based microservices architecture, as is implemented by the content distribution and optimization system 102.

At 206, the raw event data, retrieved from the message bus pipeline, may be enriched to include additional information. In accordance with an embodiment, enrichment controller 148 may be configured to enrich the raw event data, retrieved from the message bus pipeline, to include additional information. In accordance with an embodiment, the additional information may correspond to geographic information associated with an IP address of a client computing device, such as the client computing device 108*a*.

In accordance with an embodiment, the enrichment controller 148 may correspond to a post-processing layer that may be further configured to divide the augmented raw event data into small micro batch partitions, and save the augmented data set back to cloud object storage, i.e. S3. In accordance with an embodiment, the enrichment or the augmentation may pertain to geographic information about where the user's IP address belongs to. In accordance with an embodiment, the enrichment controller 148 may look up the information about the account and apply privacy compliance regulations to the events as such events flow through the enrichment controller 148. The enrichment controller 148 may further create a mechanism for which batch-based data consumers, such as the plurality of data consumers 161, may access the enriched raw event data.

In accordance with an embodiment, the enrichment controller 148 may be further configured to receive data from the restricted handler 144 and the depersonalized handler 146 from an S3+SNS message pipeline. The received data may be collated with the augmented raw event data and transmit to the operational database 150.

In order to access the heartbeat events in the enriched raw event data for deriving multiple use cases, the plurality of data consumers 161 may access the enriched raw event data based on one of the two mechanisms. A first mechanism may correspond to a registration mechanism, according to which a registry may be maintained at the plurality of enrichment layer clients 151. Based on the registry, the plurality of enrichment layer clients 151 may authorize a requesting data consumer to parse the enriched raw event data for what they want for corresponding use cases. In accordance with an embodiment, for registration, the plurality of data consumers 161 may subscribe to PII feed data that include email, IP address, and device ID in human readable form. The data consumer registers at the plurality of enrichment layer clients 151 as a registered subscriber that gets allow listed to SNS topic or queue to tell the consumer when new events have fired that they should pick up and process.

A second mechanism may correspond to a permission model, wherein the enrichment controller 148 may selectively grant a set of permissions to each of the plurality of data consumers 161 to read the enriched raw event data written in the centralized cloud object storage, i.e. an S3 bucket. Based on the set of permissions, a read request received from each of the plurality of data consumers 161 is accepted or denied at the cloud object storage.

At 208, the enriched raw event data and a normalized data feed may be collated in a time-ordered series. In accordance with an embodiment, the operational database 150 may be configured to collating the enriched raw event data, received from the enrichment controller 148, and the normalized data feed, received from the DB Ingestion handler 142, in a time-ordered series. Accordingly, the operational database 150 may provide a single point for the plurality of enrichment layer clients 151 to extract the augmented raw event data collated with the data feed and apply the requisite transformations thereupon.

In accordance with an embodiment, the videoqos heartbeats are allowed to get notified to the plurality of data consumers 161 on an S3+SNS message pipeline when new raw event data and/or data feed is received at the operational database 150.

At 210, a distinct use case may be derived for each data consumer at a same time instant based on the enriched raw event data comprising same base event metrics associated with the base event 111. In accordance with an embodiment, each of the plurality of enrichment layer clients 151 may be configured to derive a distinct use case for each data consumer at a same time instant based on the enriched raw event data comprising same base event metrics associated with the base event 111.

In accordance with an embodiment, the plurality of enrichment layer clients 151 may apply transformations on the enriched raw event data. Such a transformation may derive different use cases for the plurality of data consumers 161 in accordance with different contextual aspects. In accordance with an embodiment, various data exchange processes may be configured to retrieve one or more (or all) partitions of the enriched data set from the cloud object storage and forward the enriched data set to the plurality of enrichment layer clients 151, such as depersonalized 152, restricted 154, great lakes 156, devices 158, and application performance 160.

A first transformation by the depersonalized 152 uses the heartbeat event from the augmented raw event data and strip off the PII fields, such as user address, email, account ID, and the like, from the enriched raw events. Such augmented raw event data may be stored in the cloud data warehouse 162, such as Snowflake®, in depersonalized form. Thus, such PII is not spread to other analytical systems. The cloud data warehouse 162, i.e. the Snowflake®, may aggregate the heartbeat data for content insights reporting use case.

In an exemplary embodiment, the heartbeat data may be aggregated in the Snowflake® based on a video stream model, which is device activity by hour that may provide information about what is occurring in an hour period for a particular user on a particular device. In another exemplary embodiment, the heartbeat data may be aggregated in the Snowflake® based on the play item activity model, that may provide information, such as what was watched, the type of content, how many minutes were engaged, whether it had any errors in the session or not, based on individual segments in the video delivery.

A second transformation by the restricted 154 uses the same heartbeat event from the augmented raw event data, utilizes third-party services and allows the augmented raw event data to route to a marketing platform, such as Braze® or WANalytics®, for email and transactional delivery use case.

A third transformation by the great lakes 156 stores the enriched raw events in the data lakes 166 that corresponds to a customer service tool to provide information to customer service agents. For example, the information may be when to call in for help support, whether or not the user watched the video, or whether or not the video was successfully played.

A fourth transformation by the devices 158 extracts device information from the enriched raw events and provide such device information to device database 168 for further insights. The device information may correspond to each of the client computing devices 108 and may further include characteristics, such as category, code, location, operating system version, serial number, manufacturer, rendering agent, and client ID corresponding to each of the client computing devices 108. Such information may be provided to the device database 168 for storage.

A fifth transformation by the application performance 160 extracts multiple performance parameters, associated with the client application 109 at each of the client computing devices 108, from the enriched raw events. Examples of such application performance metrics may include an application version, platform tenant code, product code, bootstrap version, application performance index (Apdex) score, average response time, error rates, request rate, CPU usage, uptime for service level agreements (SLAs), garbage collection, and the like. Such application performance metrics may be transmitted to the analytics and monitoring application 170 for monitoring and visualization.

Thus, the derivation of the distinct use case for each data consumer at the same time instant corresponding to batch-based analytical processing is based on at least the heartbeat event.

At 212, user interaction with a player at the client computing device may be grouped from a point when a play button is clicked based on last video session initiated timestamp and device serial number or device ID. In accordance with an embodiment, the session inspection controller 186 may be configured to group the user interaction with a player at the client computing device 108a from a point when the play button is clicked based on last video session initiated timestamp and device serial number or device ID. Thus, the session inspection controller 186 may check the behavior of the video player for multiple use cases, such as validating new client instrumentation, debugging issues within a video session, and regression testing when client functionality has changed.

In a parallel flow, as illustrated in FIG. 2, at 214, one or more payloads from the plurality of payloads of the raw event data may be transmitted to a stream-based messaging bus, such as the messaging bus 172, as raw video events. In accordance with an embodiment, the serializer controller 140 may be configured to transmit the one or more payloads from the plurality of payloads of the raw event data to the stream-based messaging bus, such as the messaging bus 172, as raw video events. For example, the serializer controller 140 may be configured to transmit only the videoqos events from the raw event data to the stream-based messaging bus, such as the messaging bus 172, for real-time processing. In such an embodiment, the raw event data at the http ingress point, i.e. the serializer controller 140, may be paired with the stream-based messaging bus, such as the messaging bus 172, to obtain a linearized raw video events ordered in time-series. Thus, the raw video events on the messaging bus

172 are atomic, serialized and immutable, due to which the raw video events on real time telemetry are no older than, for example 10 seconds.

At 216, the raw video events may be enriched to include additional information. In accordance with an embodiment, the ESV 188 may be configured to enrich the raw video events to include additional information, such as geographic information, IP address, DMA, marketing, and the like into the raw video event itself. Once enriched, the ESV 188 may return the raw video events as enriched videoqos events back to the messaging bus 172. Thus, now the raw video event is enriched with geographic information and information about the CDN and network connection as well. In addition to enrichment, the ESV 188 may also add message validation and apply schema to the to the enriched raw video events.

In accordance with an embodiment, the enriched videoqos events may be utilized by the first metrics aggregation engine 174a to derive the new metrics at step 218. In accordance with another embodiment, the enriched videoqos events may be utilized by the first metrics aggregation engine 174a to construct the session at the server-side at step 226.

At 218, new metrics may be derived based on the enriched as raw video events for network selection and centralized alarming and reporting. In accordance with an embodiment, the first metrics aggregation engine 174a may be configured to derive the new metrics based on the enriched as raw video events, i.e. videoqos events, for network selection and centralized alarming and reporting.

In accordance with an embodiment, the first metrics aggregation engine 174a may be a stream-based processor that uses SQL stream API to process tera bytes of data in near real-time using traditional SQL queries and clauses. The first metrics aggregation engine 174a may derive a new metric, such as video start time, based on SQL group by clause and the state sequence between the two events, such as an initial play videoqos event and a first heartbeat event, showing up in the time series data. Other new metrics may include video playback failure, rebuffering and the like, that are all calculated by the first metrics aggregation engine 174a using the SQL group by clause emitted out as videoqos topic and may be published back on the messaging bus 172. Thus, the derivation of the new metrics for network selection and centralized alarming and reporting corresponding to real-time stream processing is based on at least the heartbeat event.

The above examples and additional ones of such new metrics, i.e. videoqos metrics, for operational reporting and alarming that may maximize the quality of video stream delivered for each data customer, are summarized below:

1. Video Start Failures (VSF): Tracks percentage of plays in which a user was unable to start the video and how to try again or was unable to play the video. The VSF may be derived via startup-error.
2. Video Play Failure (VPF): If the session ends, the total playing time from the playback error to the session end is not more than the last reported buffer length. If buffer length is not available, a default buffer length of 150 seconds (i.e., 2.5 minutes) may be utilized. Only if no event for said stream occurs after this time, can the stream be considered as VPF. The VSF may be derived via stream_startup_time_millisec
3. Video Startup Time (VST): VST is the number of seconds between when the user clicks play or video auto-starts and when video starts playing. The VST may be derived via video_startup_failure.

4. Exit before Video Starts (EBVS): EBVS is the count of streams where (sum(isStart=0, init=1, isFailure=0))/count of streams] events from video model 5. Average Bitrate Delivered: Average bitrate calculates the histogram of average bitrates reported by the player. The bits played do not include bits in buffering or bits passed during paused video. The Average Bitrate Delivered may be derived via average_bitrate 6. Connection Induced Rebuffering Ratio (CIBR): non-seekRebufferingTime/play time (seconds watched)+rebufferingTime 7. Connection Induced Rebuffering Count (CIRC): CIRC is the count of how many times during a stream play there was rebuffering followed by play, not induced by user seek, or initial buffering.

8. Media Encoding a) % Relative Time Playing at Bitrate—Corresponds to the top device names and how long their video plays at specific bitrates b) % Views That Started at Bitrate—Corresponds to top device names and what bitrate the video started to play Further examples may include Total Attempts, Total Concurrent Plays, Ended Plays, number of buffering interrupts per session, bits delivered per CDN, minutes watched, percent of minutes watched, watch next episode, video resume position, and the like.

Since the raw video events on the messaging bus 172 are atomic, serialized and immutable, the raw video events on real time telemetry are no older than, for example 10 seconds. Due to the atomic property of the raw video events, that pertains to the smallest unit of measurement relative to an activity, the aggregations of VPFs and VSFs of the client computing devices 108, for example at session level activity or at video session playback activity, may be performed at min/hour/day/month granularity across various dimensions based on atomic heartbeat events. The more frequent atomic heartbeat events are, the more precise the derived metrics are.

In accordance with an embodiment, intermediate metrics, for example concurrent plays, may be derived from VSF and VPF occurred based on the expression: (No. of heartbeats minus VPFs minus VSFs) from derived heartbeat mechanisms and shift any minute sampling due to atomic granularity of data.

In accordance with an embodiment, the derived new metrics may be utilized by the second metrics aggregation engine 174b to derive CDN scoring metrics at step 222.

At 220, the derived new metrics may be transmitted to the analytical search engine 176 for real-time aggregation. In accordance with an embodiment, the messaging bus 172 may be configured to transmit the derived new metrics to the analytical search engine 176 for real-time aggregation after synching with Logstash. Logstash is a light-weight, open-source, server-side data processing pipeline that collects data from the messaging bus 172, transform it on the fly, and send it to the analytical search engine 176, i.e. Elasticsearch®. Thus, the messaging bus 172 emits individual device level metrics for video start or video playback failure on that last video initiated device ID time along with dimensions to the analytical search engine 176.

The analytical search engine 176 may allow to define a query that can aggregate metrics, like concurrent viewership. So, instead of having to calculate every video heartbeat that occurred within a 30 second or one minute sample in the modelling procedure, a time frame may be selected from the analytical search engine 176 and it is counted that how many events occurred in that window, which makes the metrics definition more flexible. The analytical search engine 176 may further perform real-time analysis up to, for example 3 days, with no more than 4 minutes lag across about two dozen dimensions for videoqos delivery. In accordance with an embodiment, the analytical search engine 176 may further provide an intermediate stage to flexibly change the dimensional attributes or the way the business logic works without the requirement of creating a new modelling job. In accordance with an embodiment, such aggregation may be performed in Elasticsearch® with Grafana® as the front end.

In accordance with an embodiment, data may be utilized to monitor playback failures by device when new features are rolled out based on various metrics and data dimensions, such as Video Playback Failure, Device Type, Date. Such business value may be pertinent for a consumer business group, such as Technical Operations. In accordance with another embodiment, data may be utilized to ensure platform stability and performance using weekly averages based on various metrics and data dimensions, such as Play Attempts, Video Start Failure, Video Playback Failure, Video Startup Time, Exits Before Video Start. Such business value may be pertinent for a consumer business group, such as Technical Operations. In accordance with another embodiment, data may be utilized to configure filtering and routing rules for better performance by Content Delivery Network based on various metrics and data dimensions, such as Video Start Failure, Video Playback Failure, Exists Before Video Start. Such business value may be pertinent for a consumer business group, such as Technical Operations.

At 222, CDN scoring metrics topics may be derived using the videoqos topics. In accordance with an embodiment, a second metrics aggregation engine 174b may be configured to derive CDN scoring metrics using the videoqos topics.

In accordance with an embodiment, the second metrics aggregation engine 174b may be a stream-based processor that uses SQL stream API to process tera bytes of data in near real-time using traditional SQL queries and clauses. The second metrics aggregation engine 174b may derive CDN scoring metrics based on the videoqos topics. The videoqos topics or raw videoqos heartbeat events, may be determined based on the derived new metrics, such as video start failure, video playback failure and video start time. The CDN scoring metrics may be stored in the CDN scoring database 184.

At 224, a CDN may be selected for routing traffic based on the CDN scoring metrics and video metadata. In accordance with an embodiment, the CDN selector 182 may be configured to select the CDN, such as the CDN 116a, for routing traffic based on the CDN scoring metrics received from the CDN scoring database 184 and video metadata received from the comet 180. In accordance with an embodiment, the performance of multiple CDNs may be evaluated based on the CDN scoring metrics and video metadata. The CDN 116a may demonstrate the highest performance, based on which it is selected for routing traffic.

In accordance with an embodiment, relative CDN performance may be extracted using the same event paradigm or sessionalized data and determine how well the CDN 116a is performing, then actively routing traffic based on how all the available CDNs are performing in real time. In accordance with an embodiment, the quality of delivery of all the available CDNs may be derived based on device ID and the timestamp dimensions.

At 226, a session may be constructed at server-side for an application based on a defined business rule using session timestamps from the session payload. In accordance with an embodiment, the first metrics aggregation engine 174a may be configured to construct the session at the server-side for the application based on the defined business rule using session timestamps from the session payload. In accordance with an embodiment, the construction of the session continues during an application backgrounding activity.

Figure 5:
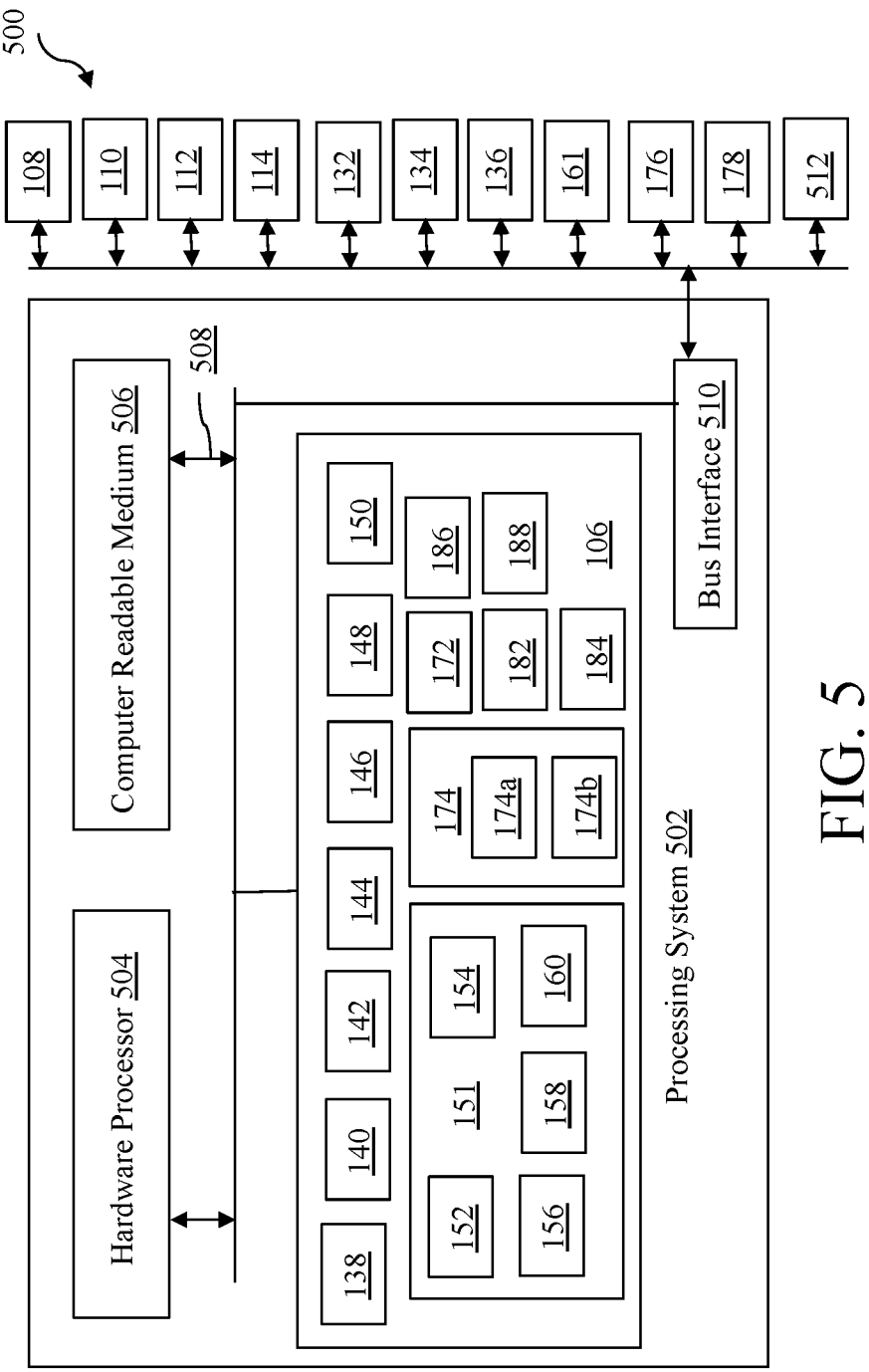
FIG. 5 is a conceptual diagram illustrating an example of a hardware implementation for the video optimization and monitoring system employing a processing system for deriving new metrics and multiple use cases of data consumers using base event metrics, in accordance with an exemplary embodiment of the disclosure.

FIG. 5 is a conceptual diagram illustrating an example of a hardware implementation for the video optimization and monitoring system 106 employing a processing system for deriving new metrics and multiple use cases of data consumers using base event metrics, in accordance with an exemplary embodiment of the disclosure. Referring to FIG. 5, the hardware implementation shown by a representation 500 for the video optimization and monitoring system 106 employs a processing system 502 for deriving new metrics and multiple use cases of data consumers using base event metrics, in accordance with an exemplary embodiment of the disclosure, as described herein.

In some examples, the processing system 502 may comprise one or more hardware processors 504, a non-transitory computer-readable medium 506, a bus 508, a bus interface 510, and a transceiver 512. FIG. 5 further illustrates the source connectors 138, the serializer controller 140, the DB ingestion handler 142, the restricted handler 144, the depersonalized handler 146, the enrichment controller 148, the operational database 150, the plurality of enrichment layer clients 151, such as the depersonalized 152, the restricted 154, the great lakes 156, the devices 158, and the application performance 160, the messaging bus 172, the first metrics aggregation engine 174a and the second metrics aggregation engine 174b (collectively referred to as the metrics aggregation engine 174), the CDN selector 182, the CDN scoring database 184, the session inspection controller 186, and the ESV controller 188.

The hardware processor 504 may be configured to manage the bus 508 and general processing, including the execution of a set of instructions stored on the computer-readable medium 506. The set of instructions, when executed by the processor 504, causes the video optimization and monitoring system 106 to execute the various functions described herein for any particular apparatus. The hardware processor 504 may be implemented, based on a number of processor technologies known in the art. Examples of the hardware processor 504 may be a Reduced Instruction Set Computing (RISC) processor, an Application-Specific Integrated Circuit (ASIC) processor, a Complex Instruction Set Computing (CISC) processor, and/or other processors or control circuits.

The non-transitory computer-readable medium 506 may be utilized for storing data that is manipulated by the processor 504 when executing the set of instructions. The data is stored for short periods or in the presence of power. The computer-readable medium 506 may also be configured to store data for one or more of the source connectors 138, the serializer controller 140, the DB ingestion handler 142, the restricted handler 144, the depersonalized handler 146, the enrichment controller 148, the operational database 150, the plurality of enrichment layer clients 151, such as the depersonalized 152, the restricted 154, the great lakes 156, the devices 158, and the application performance 160, the messaging bus 172, the first metrics aggregation engine 174a and the second metrics aggregation engine 174b (collectively referred to as the metrics aggregation engine 174), the CDN selector 182, the CDN scoring database 184, the session inspection controller 186, and the ESV controller 188.

The bus 508 is configured to link together various circuits. In this example, the video optimization and monitoring system 106 employing the processing system 502 and the non-transitory computer-readable medium 506 may be implemented with bus architecture, represented generally by bus 508. The bus 508 may include any number of interconnecting buses and bridges depending on the specific implementation of the video optimization and monitoring system 106 and the overall design constraints. The bus interface 510 may be configured to provide an interface between the bus 508 and other circuits, such as, the transceiver 512, and external devices and sources, such as the ancillary service 132, the databases 134, the third-party systems 136, the plurality of data consumers 161, such as the cloud data warehouse 162, the customer/client data platform 164, data lake 166, the device database 168, and the analytics and monitoring application 170, the analytical search engine 176, the graphic authoring tool 178a, the analytical and visualization templates 178b and the incident management service 178c (collectively referred to as external tools 178), and the comet 180.

The transceiver 512 may be configured to provide a communication of the video optimization and monitoring system 106 with various other components, such as the ancillary service 132, the databases 134, the third-party systems 136, the plurality of data consumers 161, such as the cloud data warehouse 162, the customer/client data platform 164, data lake 166, the device database 168, and the analytics and monitoring application 170, the analytical search engine 176, the graphic authoring tool 178a, the analytical and visualization templates 178b and the incident management service 178c (collectively referred to as external tools 178), and the comet 180. The transceiver 512 may communicate via wireless communication with networks, such as the Internet, the CDNs, the Intranet and/or a wireless network, such as a cellular telephone network, a wireless local area network (WLAN) and/or a metropolitan area network (MAN). The wireless communication may use any of a plurality of communication standards, protocols and technologies, such as Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), and/or Wi-MAX.

It should be recognized that, in some embodiments of the disclosure, one or more components of FIG. 5 may include software components whose corresponding code may be executed by at least one processor, for across multiple processing environments. Such software components may be executed across a single or multiple processing environments.

In an aspect of the disclosure, the processor 504, the computer-readable medium 506 (or a memory), or a combination of both may be configured or otherwise specially programmed to execute the operations or functionality of the source connectors 138, the serializer controller 140, the DB ingestion handler 142, the restricted handler 144, the depersonalized handler 146, the enrichment controller 148, the operational database 150, the plurality of enrichment layer clients 151, such as the depersonalized 152, the restricted 154, the great lakes 156, the devices 158, and the application performance 160, the messaging bus 172, the first metrics aggregation engine 174a and the second metrics aggregation engine 174b (collectively referred to as the metrics aggregation engine 174), the CDN selector 182, the CDN scoring database 184, the session inspection controller 186, and the ESV controller 188, as described with respect to FIGS. 1A and 1B.

Various embodiments of the disclosure comprise the video optimization and monitoring system 106 in the content distribution and optimization system 102 that may include a hardware processor 504, that may correspond to the serializer controller 140 in the data pipeline service 106a implemented in the content distribution and optimization system 102. The serializer controller 140 may be configured to ingest raw event data from a client computing device, such as the client computing device 108a, at an entry point of the data pipeline service 106a in accordance with a defined schema, such as JSON schema. The raw event data may correspond to the base event 111 comprising a plurality of payloads. Each payload may comprise a first set of dimensional properties provided by the client computing device 108a and/or a second set of dimensional properties added by the serializer controller 140 at the entry point. Each of the first and the second sets of dimensional properties corresponds to logically grouped attributes and corresponding data values. The serializer controller 140 may be further configured to transmit the raw event data to a message bus pipeline, i.e. S3+SQS, for enrichment. A distinct use case may be derived for each data consumer at a same time instant based on the enriched raw event data comprising same base event metrics associated with the base event 111. The serializer controller 140 may be further configured to transmit one or more payloads from the plurality of payloads of the raw event data to a stream-based messaging bus, such as the messaging bus 172, as raw video events. New metrics may be derived based on the raw video events for network selection and centralized alarming and reporting.

Various embodiments of the disclosure may provide a non-transitory computer-readable medium, such as the non-transitory computer-readable medium 506, having stored thereon, computer implemented instruction that when executed by a processor causes the video optimization and monitoring system 106 to execute operations for deriving new metrics and multiple use cases of data consumers using base event metrics. The video optimization and monitoring system 106 may execute operations comprising ingesting raw event data from a client computing device, such as the client computing device 108a, at an entry point of the data pipeline service 106a in accordance with a defined schema, such as JSON schema. The raw event data may correspond to the base event 111 comprising a plurality of payloads. Each payload may comprise a first set of dimensional properties provided by the client computing device 108a and/or a second set of dimensional properties added by the serializer controller 140 at the entry point. Each of the first and the second sets of dimensional properties corresponds to logically grouped attributes and corresponding data values. The video optimization and monitoring system 106 may execute further operations comprising transmitting the raw event data to a message bus pipeline, i.e. S3+SQS, for enrichment. A distinct use case may be derived for each data consumer at a same time instant based on the enriched raw event data comprising same base event metrics associated with the base event 111. The video optimization and monitoring system 106 may execute further operations comprising transmitting one or more payloads from the plurality of payloads of the raw event data to a stream-based messaging bus, such as the messaging bus 172, as raw video events.

New metrics may be derived based on the raw video events for network selection and centralized alarming and reporting.

The proposed content distribution and optimization system and method for deriving new metrics and multiple use cases of data consumers using base event metrics may be advantageous over the prior art. The proposed system provides event ingesting in a publisher/subscriber (Pub/Sub) model that allows to create a single publication of the base event 111 emitted by the client computing device 108a, and perform batch-based analytical processing, real-time aggregation, and real-time monitoring thereupon. The Pub/Sub model further allows to drive product scenario features, for example where to resume a playback, on the application itself for different client devices. The base event 111 may be atomic, serializable and mutable event for video that can be used by the plurality of data consumers 161 for operation monitoring, content aggregation and product use cases all through the same data pipeline service 106a.

Further, standardization on the heartbeat mechanism that has a set of dimensions that may be utilized for different types of data consumer use cases. The heartbeat mechanism is extended to other scenarios around application health monitoring for how the quality of delivery is monitored. Thus, the heartbeat mechanism is applied to not just the session for video delivery, but the whole application rendering experience as the user interacts with the application itself.

Further, the session inspection controller 186 may use a SQL query that allows to query for the player session IDs using hashed version of the device ID and last video initiated timestamp in a group by clause, which allows to pull all the activity consistently for a sub-stream rather than having to manage a direct player session identifier from the service deck to the client computing device 108a back to the video optimization and monitoring system 106.

Further, the video optimization and monitoring system 106 uses SQL to do streaming calculations of metrics in real time to deliver videoqos aggregates. Furthermore, the highly efficient real-time CDN scoring service returns a prioritized list of CDNs based on business rules and current performance and ordered by corresponding scores so that the player can failover to the second or third best CDN if an issue is occurring with the primary CDN allocated for the session or segment of video delivery.

As utilized herein the terms "circuits" and "circuitry" 'refer to physical electronic components (for example, hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for deriving new metrics and multiple use cases of data consumers using base event metrics.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual servers or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure is not limited to the particular embodiment disclosed, but that the present disclosure will include all embodiments falling within the scope of the appended claims.

What is claimed is:

1. A content distribution and optimization system, comprising:
   a memory for storing instructions; and
   one or more processors configured to execute the instructions, and based on the executed instructions, the one or more processors are configured to:
   ingest raw event data from a client computing device at an entry point of a data pipeline service in accordance with a defined schema, wherein:
   (i) the raw event data corresponds to a base event comprising a plurality of contextual payloads and a plurality of base event metrics,
   (ii) a contextual payload of the plurality of contextual payloads comprises at least one of a first set of dimensional properties provided by the client computing device or a second set of dimensional properties added at the entry point, and
   (iii) the first set of dimensional properties and the second set of dimensional properties correspond to one or more logically grouped attributes and one or more data values corresponding to the one or more logically grouped attributes;
   provide the raw event data to a message bus pipeline for enrichment, wherein:
   (i) one or more transformations are applied on enriched raw event data comprising the plurality of base event metrics to derive, at a same time instant, a distinct use case for each data consuming tool or service of a plurality of data consuming tools or services, wherein each use case is in a respective format configured for direct access by each respective data consuming tool or service of the plurality of data consuming tools or services, wherein multiple distinct use cases are associated with a same base event and the one or more transformations comprises one or more of a depersonalization, a marketing transformation, a customer service transformation, a device information transformation, or a performance transformation, and a transformation of the one or more transformations for a respective use case is based on one or more contextual aspects of a respective data consuming tool or service for the respective use case; and (ii) the distinct use cases correspond to one or more contextual payloads of the plurality of contextual payloads; and provide the one or more contextual payloads from the plurality of contextual payloads to a stream-based messaging bus as raw video events, wherein one or more new metrics are derived based on the raw video events for network selection and centralized alarming and reporting.

2. The content distribution and optimization system according to claim 1, wherein the plurality of base event metrics comprise application metrics, device metrics, session metrics and heartbeat metrics to provide the distinct use case for each data consuming tool or service of the plurality of data consuming tools or services.

3. The content distribution and optimization system according to claim 1, wherein the raw event data is retrieved from a cloud object storage of the message bus pipeline, wherein the retrieved raw event data is enriched with additional information, and wherein the additional information corresponds to geographic information associated with an internet protocol (IP) address of the client computing device.

4. The content distribution and optimization system according to claim 1, wherein the enriched raw event data and a normalized data feed is collated in a time-ordered series.

5. The content distribution and optimization system according to claim 1, wherein a user interaction is grouped with a player at the client computing device from a point associated with an initiation of play based on a last video session initiated timestamp and a device serial number or a device identifier (ID).

6. The content distribution and optimization system according to claim 1, wherein the raw video events are enriched to include additional information, wherein the additional information includes at least geographic information of the client computing device and designated market area (DMA), and wherein the raw video events are further validated and structured in addition to the enrichment.

7. The content distribution and optimization system according to claim 1, wherein the one or more new metrics are transmitted to an analytical search engine for real-time aggregation.

8. The content distribution and optimization system according to claim 1, wherein a session is constructed at server-side for an application based on a defined business rule using session timestamps from a session payload, and wherein the session payload comprises an application launch timestamp.

9. The content distribution and optimization system according to claim 1, wherein the plurality of contextual payloads corresponds to an application payload, a device payload, a session payload, a referral payload, a visitor identity payload, an event payload, and a page payload.

10. The content distribution and optimization system according to claim 9, wherein the first set of dimensional properties of the event payload includes a type of the base event, a subtype of the base event, and a client timestamp, and wherein the second set of dimensional properties of the event payload includes a server timestamp.

11. The content distribution and optimization system according to claim 10, wherein the subtype of the base event is a heartbeat event when the type of the base event is video quality of service (QOS) event, wherein the heartbeat event corresponds to an application heartbeat or a video heartbeat, and wherein a derivation of the distinct use case for each data consuming tool or service of the plurality of data consuming tools or services corresponds to batch-based analytical processing and a derivation of the one or more new metrics for network selection and centralized alarming and reporting correspond to real-time stream processing based on at least the heartbeat event.

12. The content distribution and optimization system according to claim 1, wherein each data consuming tool or service of the plurality of data consuming tools or services corresponds to at least one of a QoS delivery tool, a reporting tool, a customer service tool, an internal fraud tool, a content insights tool, or a subscription reporting tool.

13. A content distribution and optimization method, comprising:

ingesting, by one or more processors, raw event data from a client computing device at an entry point of a data pipeline service in accordance with a defined schema, wherein:

(i) the raw event data corresponds to a base event comprising a plurality of contextual payloads and a plurality of base event metrics, (ii) a contextual payload of the plurality of contextual payloads comprises a first set of dimensional properties provided by the client computing device or a second set of dimensional properties added at the entry point, and (iii) the first set of dimensional properties and the second set of dimensional properties correspond to one or more logically grouped attributes and one or more data values corresponding to the one or more logically grouped attributes;

providing the raw event data to a message bus pipeline for enrichment, wherein:

(i) one or more transformations are applied on enriched raw event data comprising the plurality of base event metrics to derive, at a same time instant, a distinct use case for each data consuming tool or service of a plurality of data consuming tools or services, wherein each use case is in a respective format configured for direct access by each respective data consuming tool or service of the plurality data consuming tools or services, wherein multiple distinct use cases are associated with a same base event and the one or more transformations comprises one or more of a depersonalization, a marketing transformation, a customer service transformation, a device information transformation, or a performance transformation, and a transformation of the one or more transformations for a respective use case is based on one or more contextual aspects of a respective data consuming tool or service for the respective use case, and (ii) the distinct use cases correspond to one or more contextual payloads of the plurality of contextual payloads; and providing one or more contextual payloads from the plurality of contextual payloads to a stream-based messaging bus as raw video events, wherein one or more new metrics are derived based on the raw video events for network selection and centralized alarming and reporting.

14. A non-transitory computer readable medium, having stored thereon, computer executable code, which when executed by one or more processors, cause the one or more processors to execute operations, the operations comprising:

ingesting raw event data from a client computing device at an entry point of a data pipeline service in accordance with a defined schema, wherein:

(i) the raw event data corresponds to a base event comprising a plurality of contextual payloads and a plurality of base event metrics, (ii) a contextual payload of the plurality of contextual payloads comprises a first set of dimensional properties provided by the client computing device or a second set of dimensional properties added at the entry point, and (iii) the first set of dimensional properties and the second set of dimensional properties correspond to one or more logically grouped attributes and one or more data values corresponding to the one or more logically grouped attributes;

providing the raw event data to a message bus pipeline for enrichment, wherein:

(i) one or more transformations are applied on enriched raw event data comprising the plurality of base event metrics to derive, at a same time instant, a distinct use case for each data consuming tool or service of a plurality of data consuming tools or services, which each use case is in a respective format configured for direct access by each respective data consuming tool or service of the plurality of data consuming tools or services, wherein multiple distinct use cases are associated with a same base event and the one or more transformations comprises one or more of a depersonalization, a marketing transformation, a customer service transformation, a device information transformation, or a performance transformation, and a transformation of the one or more transformations for a respective use case is based on one or more contextual aspects of a respective data consuming tool or service for the respective use case, and (ii) the distinct use cases correspond to one or more contextual payloads of the plurality of contextual payloads; and providing one or more contextual payloads from the plurality of contextual payloads to a stream-based messaging bus as raw video events, wherein one or more new metrics are derived based on the raw video events for network selection and centralized alarming and reporting.

15. The content distribution and optimization system according to claim 1, wherein the one or more processors are further configured to enrich the raw event data with at least one of information about a content delivery network (CDN) associated with the raw event data, or information about a network connection associated with the raw event data, wherein the enriched raw event data is provided to a CDN scoring database, the CDN scoring database is accessed to select a CDN for routing traffic.

16. The content distribution and optimization system according to claim 1, wherein the respective data consuming tool or service comprises a marketing platform, the transformation of the one or more transformations comprises the marketing transformation, and the marketing transformation comprises aggregating heartbeat metrics associated with user interactions at a client computing device.

17. The content distribution and optimization system according to claim 1, wherein the respective data consuming tool or service comprises a customer service tool, the transformation of the one or more transformations comprises the customer service transformation, and the customer service transformation comprises aggregating customer service information associated with at least one of successful video playback or failed video playback.

18. The content distribution and optimization system according to claim 1, wherein the respective transformation comprises at least the device information transformation, and the device information transformation comprises aggregating details associated with the client computing device, comprising one or more characteristics, a category, a code, a location, an operating system version, a serial number, a manufacturer, a rendering agent, or a client computing device identifier for a respective client computing device.

19. The content distribution and optimization system according to claim 1, wherein the respective data consuming tool or service comprises an analytics and monitoring application, the transformation of the one or more transformations comprise at least the performance transformation, and the performance transformation comprises aggregating one or more of an application version, a platform tenant code, a product code, a bootstrap version, an application performance index score, an average response time, an error rate, a request rate, a computer processing unit usage metric, uptime for service level agreements (SLAs), or a garbage collection metric.

20. The content distribution and optimization system according to claim 1, wherein the one or more transformations comprises a depersonalization.

* * * * *